(12) United States Patent
Morimoto

(10) Patent No.: US 8,032,802 B2
(45) Date of Patent: Oct. 4, 2011

(54) STORAGE DEVICE, MEMORY, TERMINAL, SERVER, SERVER-CLIENT SYSTEM, STORAGE MEDIUM, AND CONTROL DEVICE

(75) Inventor: Yasuaki Morimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1056 days.

(21) Appl. No.: 11/895,684

(22) Filed: Aug. 27, 2007

(65) Prior Publication Data

US 2008/0130434 A1 Jun. 5, 2008

(30) Foreign Application Priority Data

Nov. 30, 2006 (JP) ................. 2006-324819

(51) Int. Cl.
G06F 11/00 (2006.01)
G11C 29/00 (2006.01)
(52) U.S. Cl. ........................ 714/708; 714/769
(58) Field of Classification Search .................. 714/708, 714/769
See application file for complete search history.

(56) References Cited

U.S. PATENT DOCUMENTS

| 5,278,703 | A | * | 1/1994 | Rub et al. ................ 360/51 |
| 5,533,031 | A | * | 7/1996 | Dounn et al. .............. 714/718 |
| 5,617,399 | A | * | 4/1997 | Spruit et al. ............. 369/47.53 |
| 5,737,481 | A | | 4/1998 | Gushima et al. |
| 5,996,105 | A | * | 11/1999 | Zook ........................ 714/755 |
| 6,545,832 | B1 | * | 4/2003 | Sugawara et al. ........... 360/53 |
| 7,012,771 | B1 | * | 3/2006 | Asgari et al. .............. 360/31 |
| 2006/0101198 | A1 | | 5/2006 | Cho et al. |

FOREIGN PATENT DOCUMENTS

| EP | 1 486 976 A1 | 12/2004 |
| JP | 62-028976 | 2/1987 |
| JP | 04-106764 | 4/1992 |
| JP | 05-062360 | 3/1993 |
| JP | 08-007287 | 1/1996 |
| JP | 11-232046 | 8/1999 |
| JP | 2000-222830 | 8/2000 |
| JP | 2001-076435 | 3/2001 |
| JP | 2003-272298 | 9/2003 |
| JP | 2006-139902 | 6/2006 |

OTHER PUBLICATIONS

Japanese Office Action issued in Japanese Application No. 2006-324819, mailed Dec. 21, 2010.
Japanese Office Action issued in Japanese Application No. 2006-324819, mailed Feb. 22, 2011.

* cited by examiner

*Primary Examiner* — Joseph D Torres
(74) *Attorney, Agent, or Firm* — Greer, Burns & Crain, Ltd.

(57) ABSTRACT

In a storage device, a bad-sector detecting unit detects a bad sector, and a process determining unit determines whether rescue process is performed for the bad sector. Upon determining to perform the rescue process, the process determining unit controls a damping ratio. A table-updating control unit records various information in an alternating-process control table, and a controller records and reproduces data with respect to a rescue sector based on the alternating-process control table.

7 Claims, 28 Drawing Sheets

FIG.4

ALTERNATING-PROCESS
CONTROL TABLE

| BAD SECTOR ID NUMBER | DATA SPECIFYING PROCESS | DAMPING RATIO |
|---|---|---|
| 100001 | RESCUE PROCESS | 2 |
| 200045 | SLIPPING PROCESS | - |
| ⋮ | ⋮ | ⋮ |

FIG.10

ALTERNATING-PROCESS CONTROL TABLE

| BAD SECTOR ID NUMBER | DATA SPECIFYING PROCESS | REPLACEMENT SECTOR ID NUMBER | DAMPING RATIO |
|---|---|---|---|
| 100031 | PARTIAL REPLACEMENT PROCESS | 500005 | 2 |
| 200036 | FULL-REPLACEMENT PROCESS | 500015 | - |
| ... | ... | ... | ... |

FIG.15

| ORIGINAL SECTOR SIZE S | RECORDING CLOCK DAMPING RATIO M | NUMBER OF BYTES FOR RECORDING DETERMINATION | | | | NUMBER OF PASSING BYTES (RESCUE SECTOR) | SLIPPING PROCESS | NUMBER OF RESCUE BYTES (REPLACEMENT RESCUE SECTOR) | NUMBER OF REPLACE BYTES (REPLACEMENT SECTOR) | SECTOR SIZE*NUMBER OF SECTORS |
|---|---|---|---|---|---|---|---|---|---|---|
| | | FIRST | SECOND | THIRD | FOURTH | | | | | |
| 1024 | 1 | 1024 | | | | 1024 | x | 512 | 512 | 512*1 |
| 1024 | 1 | 1024 | | | | 1024 | x | 0 | 1024 | 512*2 |
| 1024 | 2 | | 512 | | | 512 | x | 0 | 512 | 512*1 |
| 1024 | 2 | | 512 | | | x | 1024 | 512 | 512 | 512*1 |
| 1024 | 2 | | 512 | | | x | 1024 | 0 | 1024 | 512*2 |
| 2048 | 1 | 2048 | | | | 2048 | x | 0 | 1024 | 512*2 |
| 2048 | 1 | 2048 | | | | 2048 | x | 0 | 2048 | 512*4 |
| 2048 | 2 | | 1024 | | | 1024 | x | 512 | 512 | 512*1 |
| 2048 | 2 | | 1024 | | | 1024 | x | 0 | 1024 | 512*2 |
| 2048 | 2 | | 1024 | | | x | 2048 | 1024 | 1024 | 512*2 |
| 2048 | 2 | | 1024 | | | x | 2048 | 0 | 2048 | 512*4 |
| 2048 | 4 | | | 512 | | 512 | x | 512 | 512 | 512*1 |
| 2048 | 4 | | | 512 | | x | 2048 | 1024 | 1024 | 512*2 |
| 2048 | 4 | | | 512 | | x | 2048 | 0 | 2048 | 512*4 |
| 4096 | 1 | 4096 | | | | 4096 | x | 2048 | 2048 | 512*4 |
| 4096 | 1 | 4096 | | | | 4096 | x | 0 | 4096 | 512*8 |
| 4096 | 2 | | 2048 | | | 2048 | x | 1024 | 1024 | 512*2 |
| 4096 | 2 | | 2048 | | | 2048 | x | 0 | 2048 | 512*4 |
| 4096 | 2 | | 2048 | | | x | 4096 | 2048 | 2048 | 512*4 |
| 4096 | 2 | | 2048 | | | x | 4096 | 0 | 4096 | 512*8 |
| 4096 | 4 | | | 1024 | | 1024 | x | 512 | 512 | 512*1 |
| 4096 | 4 | | | 1024 | | 1024 | x | 0 | 1024 | 512*2 |
| 4096 | 4 | | | 1024 | | x | 4096 | 2048 | 2048 | 512*4 |
| 4096 | 4 | | | 1024 | | x | 4096 | 0 | 4096 | 512*8 |
| 4096 | 8 | | | | 512 | 512 | x | 0 | 512 | 512*1 |
| 4096 | 8 | | | | 512 | x | 4096 | 2048 | 2048 | 512*4 |
| 4096 | 8 | | | | 512 | x | 4096 | 0 | 4096 | 512*8 |

Columns at right grouped under: DETECT BAD SECTOR UPON PHYSICAL FORMATTING (NUMBER OF PASSING BYTES, SLIPPING PROCESS); DETECT BAD SECTOR IN USER'S USE (NUMBER OF RESCUE BYTES, NUMBER OF REPLACE BYTES, SECTOR SIZE*NUMBER OF SECTORS).

FIG.17

ALTERNATING-PROCESS CONTROL TABLE

| BAD SECTOR ID NUMBER | DATA SPECIFYING PROCESS | REPLACEMENT SECTOR ID NUMBER | DAMPING RATIO |
|---|---|---|---|
| 100001 | RESCUE PROCESS | - | 2 |
| 200036 | SLIPPING PROCESS | - | - |
| ... | ... | ... | ... |
| 100031 | PARTIAL REPLACEMENT PROCESS | 500005 | 2 |
| 200036 | FULL-REPLACEMENT PROCESS | 500015 | - |
| ... | ... | ... | ... |

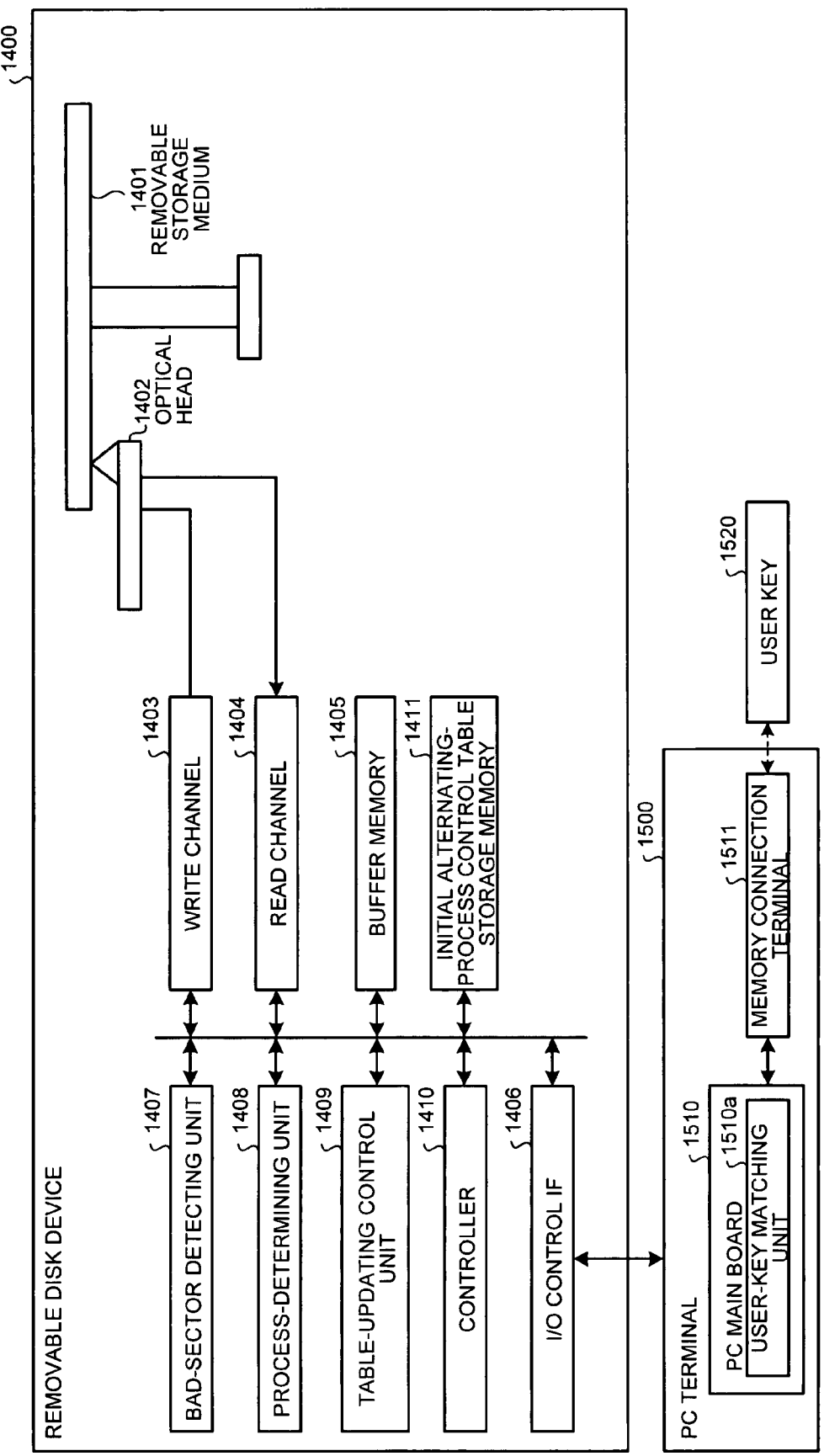

STORAGE DEVICE, MEMORY, TERMINAL, SERVER, SERVER-CLIENT SYSTEM, STORAGE MEDIUM, AND CONTROL DEVICE

BACKGROUND OF THE INVENTION

1. Field of the Invention

The present invention relates to a storage device, a memory, terminal, a server, a server-client system, a storage medium, and a control device.

2. Description of the Related Art

Physical formatting is performed to use a magnetic disk incorporated in a magnetic disk device. Physical formatting divides a storage area of the magnetic disk into sectors of predetermined bytes to manage and locate the sectors for reading and writing. Japanese Patent Application Laid-open No. 5-62360 discloses a technology in which, when a bad sector (a sector in which an error rate will be equal to or greater than a reference value, and error correction will be disabled) is detected during physical formatting, the magnetic disk device performs slipping process thereto, and writes or reads user data on other sectors regarding the bad sector as unusable.

When, after physical formatting, a bad sector is detected at the time of storing user data, a magnetic disk device performs replacement process to store user data to be stored in a bad sector in an area previously secured on the magnetic disk instead.

Japanese Patent Application Laid-open No. 11-232046 discloses a technology in which, when data stored in a bad sector on a magnetic disk is transferred to an alternative sector, data in a plurality of sectors including the alternative sector is read all together to be stored in a memory. This suppresses a reduction in performance between a host computer and a magnetic disk device due to access to the alternative sector.

However, slipping process/replacement process is performed to a detected bad sector when or after physical formatting is performed and the bad sector is regarded as unusable in the conventional technology, thereby leading to a significant reduction in a capacity that can be used on a magnetic disk due to more bad sectors, which is directly associated with a reduction in a yield without satisfying a storage capacity defined by a specification of a device.

That is, when a bad sector is detected, there is a need to prevent a capacity that can be used on a magnetic disk from significantly reducing when a sector size (the number of bytes that can be recorded) is magnified from current 512 bytes to 1024 bytes, 2048 bytes, or 4096 bytes. Conventional slipping process gives a bad influence to a data transfer speed because a blank sector is physically present.

SUMMARY OF THE INVENTION

It is an object of the present invention to at least partially solve the problems in the conventional technology.

According to an aspect of the present invention, a storage device that performs formatting to divide a storage area of a storage medium into sectors of predetermined bytes and records data on the sectors, includes a detecting unit that detects from the sectors a bad sector with an error rate to be equal to or higher than a reference value in which error correction will be impossible, and a control unit that records data on the bad sector at a recording density lower than a recording density at which data is recorded on other sectors.

According to another aspect of the present invention, a memory is configured to be removably connected to a storage device that performs formatting to divide a storage area of a storage medium into sectors of predetermined bytes and records data on the sectors. The storage device detects from the sectors a bad sector with an error rate to be equal to or higher than a reference value in which error correction will be impossible, and records data on the bad sector with less number of recording clocks than the number of recording clocks for recording data on other sectors. The memory stores therein a table that contains the number of recording clocks used to record the data on the bad sector and identification information that identifies the bad sector in an associated manner.

According to still another aspect of the present invention, a terminal is configured to be connected to a storage device that performs formatting to divide a storage area of a storage medium into sectors of predetermined bytes and records data on the sectors. The storage device detects from the sectors a bad sector with an error rate to be equal to or higher than a reference value in which error correction will be impossible, and records data on the bad sector with less number of recording clocks than the number of recording clocks for recording data on other sectors. The terminal includes a storage unit that stores therein a table that contains the number of recording clocks used to record the data on the bad sector and identification information that identifies the bad sector in an associated manner.

According to still another aspect of the present invention, a server that provides services to a client terminal through a communication line, includes a storage device that performs formatting to divide a storage area of a storage medium into sectors of predetermined bytes and records data on the sectors. The storage device detects from the sectors a bad sector with an error rate to be equal to or higher than a reference value in which error correction will be impossible and records data on the bad sector with less number of recording clocks than the number of recording clocks for recording data on other sectors. The server further includes a storage unit that temporarily stores therein a table that contains the number of recording clocks used to record the data on the bad sector and identification information that identifies the bad sector in an associated manner, and an output unit that outputs the table stored in the storage unit to the client terminal.

According to still another aspect of the present invention, a server-client system includes a client terminal, and a server that provides services to the client terminal. The server includes a storage device that performs formatting to divide a storage area of a storage medium into sectors of predetermined bytes and records data on the sectors. The storage device detects from the sectors a bad sector with an error rate to be equal to or higher than a reference value in which error correction will be impossible and records data on the bad sector with less number of recording clocks than the number of recording clocks for recording data on other sectors. The server further includes a storage unit that temporarily stores therein a table that contains the number of recording clocks used to record the data on the bad sector and identification information that identifies the bad sector in an associated manner, and an output unit that outputs the table stored in the storage unit to the client terminal.

According to still another aspect of the present invention, a storage medium has a storage area which is divided into sectors of predetermined bytes to record data on the sectors. When the sectors include a bad sector with an error rate to be equal to or higher than a reference value in which error correction will be impossible, the storage medium stores therein a table that contains number of recording clocks used to record data on the bad sector.

According to still another aspect of the present invention, a control device that performs formatting to divide a storage area of a storage medium into sectors of predetermined bytes and records data on the sectors, includes a detecting unit that detects from the sectors a bad sector with an error rate to be equal to or higher than a reference value in which error correction will be impossible, and a control unit that records data on the bad sector at a recording density lower than a recording density at which data is recorded on other sectors.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is an example of contents of an alternating-process control table according to the first embodiment;

FIG. 10 is an example of contents of an alternating-process control table according to the second embodiment;

FIG. 15 is a table for explaining a relation among sizes of data recorded on a rescue sector, a replacement rescue sector, and a replacement sector for standard sector sizes of 1024, 2048, and 4096 bytes and damping ratios of 2, 4, and 8;

FIG. 17 is an example of contents of an alternating process control table stored in a nonvolatile memory;

FIG. 28 is a functional block diagram of another removable disk device.

DETAILED DESCRIPTION OF THE PREFERRED EMBODIMENTS

Exemplary embodiments of the present invention are explained below in detail with reference to the accompanying drawings.

Figure 1:
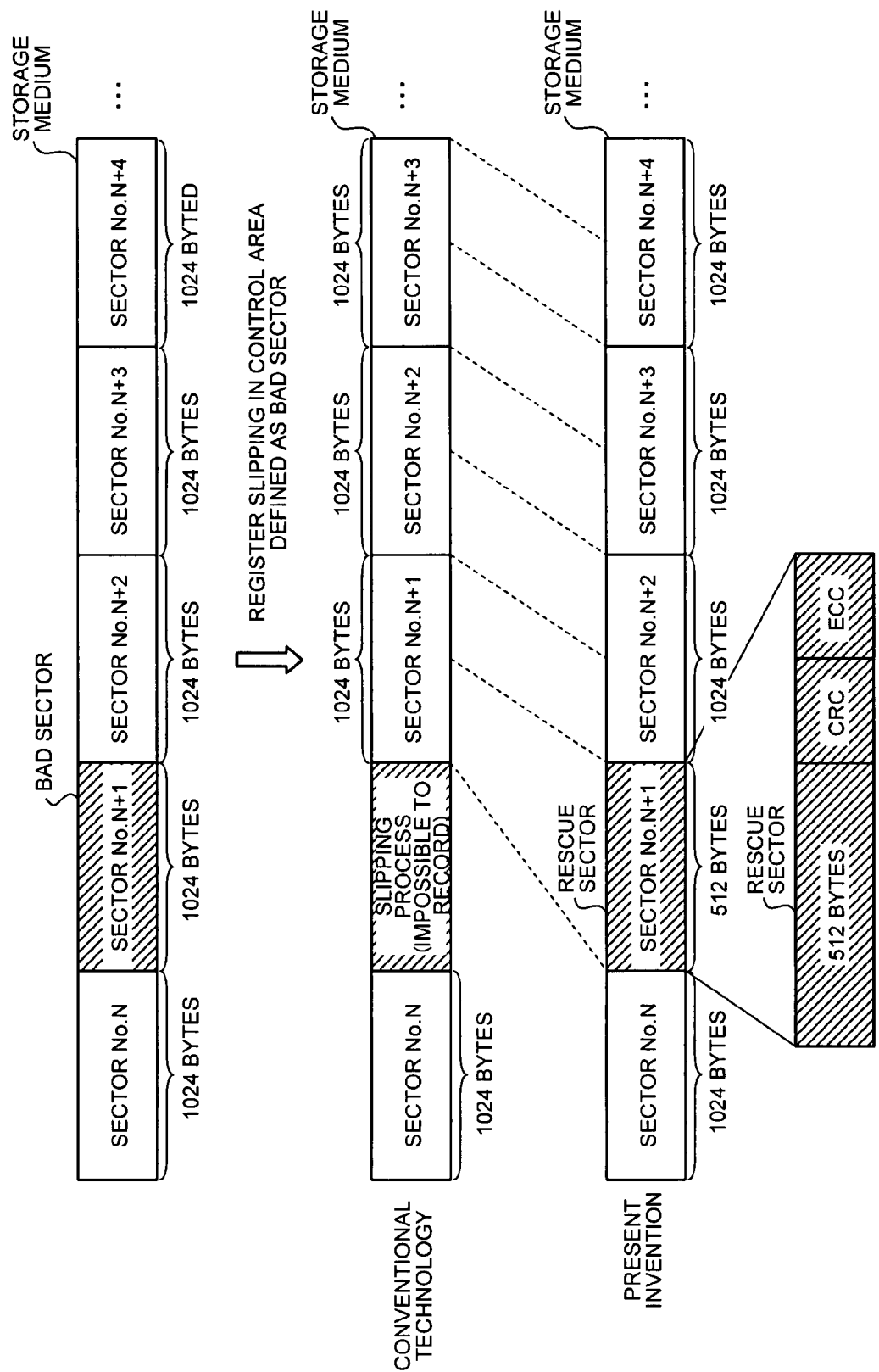
FIG. 1 is a schematic for explaining characteristics of a storage device according to a first embodiment of the present invention.

Characteristics of a storage device according to a first embodiment of the present invention are explained with reference to FIG. 1 while being compared with a conventional technology. In the first embodiment, an explanation is given of, but not limited to, a case where each sector size is 1024 bytes when physical formatting is performed for a storage medium (for example, a magnetic disk).

When physical formatting is performed for a storage medium to detect a bad sector (in which an error rate is a reference value or more and an error cannot be corrected) in a conventional storage device, slipping process is performed to the bad sector and then the bad sector is regarded as unusable. More specifically, when an N+first sector in a first row of FIG. 1 is detected as a bad sector, the N+first sector is regarded as unusable and the code numbers in the following N+second sector or later are staggered one by one and used (see a second row in FIG. 1).

However, slipping process is performed to the bad sector detected when implementing physical formatting in the conventional technology and then the bad sector is regarded as unusable. Accordingly, the more sectors that are not required, the significantly less capacity that can be used on the storage medium. Alternatively, another problem occurs in that a transfer speed is reduced.

On the other hand, when physical formatting is performed to a storage medium in the storage device according to the first embodiment to detect a bad sector, data is recorded on the bad sector at a lower recording density than a recording density for a normal sector (hereinafter, a standard sector). Even a bad sector, in which an error rate is a reference value or more when data is written at an ordinary recording density, can properly store data by decreasing a recording density. Therefore, the bad sector can be reused as a normal sector (hereinafter, a rescue sector) that has a less recording capacity than an ordinary sector (see a third row in FIG. 1).

When storing data in a bad sector, the storage device according to the first embodiment sets the number of recording clocks to record data to a small value. Hereinafter, the number of recording clocks for recording data in a bad sector is depicted as the number of control recording clocks.

When the number of recording clocks to record data in a standard sector (hereinafter, the number of standard recording clocks) is F1 and the number of control recording clocks is F2, it is possible to represent F2=F1/M. When a data capacity recorded on the standard sector based on the number of standard recording clocks F1 is regarded as D1 byte and a data capacity stored in a bad sector (rescue sector) based on the number of control recording clocks F2 is regarded as D2 byte, it is possible to represent D2=D1/M.

M in the above formula represents a damping ratio in the number of recording clocks. The larger damping ratio M, the smaller value of the number of control recording clocks and the smaller data capacity stored in the rescue sector. A numeral value of the n-th power of 2 (n: a positive integer) is substituted for the damping ratio M.

For example, when the size of each standard sector is 1024 bytes and the damping ratio M is set to 2 based on physical formatting, 512-byte data is stored in the rescue sector.

Thus, when detecting a bad sector in the storage device according to the first embodiment, data is stored in a bad sector (rescue sector) based on the number of control recording clocks to efficiently utilize a bad sector and prevent a storage capacity from decreasing due to a bad sector at the minimum. A recording density of the rescue sector is lower than that of the standard sector, therefore significantly increasing signal to noise ratio (SNR).

The storage device according to the first embodiment calculates cyclic redundancy check (CRC) redundancy bits and error correcting code (ECC) redundancy bits based on data stored in the rescue sector. A bit length in CRC redundancy bits and ECC redundancy bits added to the rescue sector can be significantly reduced, compared with CRC redundancy bits and ECC redundancy bits added to data in the standard sector.

The number of reproducing clocks for reproducing data stored in the standard sector (hereinafter, standard reproducing clocks) is the same as the number of standard recording clocks F1, and the number of reproducing clocks for reproducing data stored in the rescue sector (hereinafter, control reproducing clocks) is the same as the number of control recording clocks F2 for recording data on the rescue sector.

Figure 2:
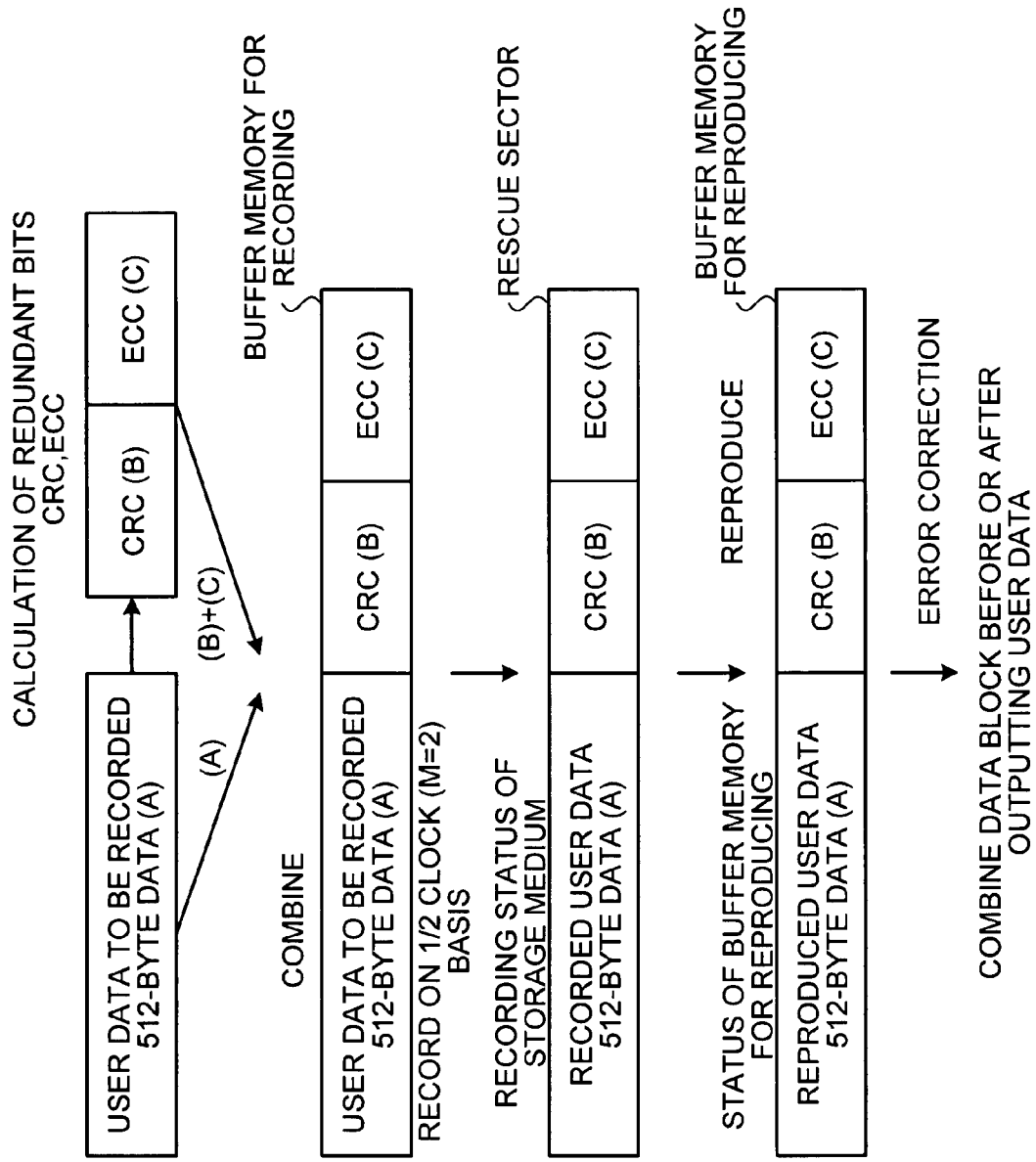
FIG. 2 is a schematic for explaining process of adding CRC redundancy bits/ECC redundancy bits to data recorded on a rescue sector and data generation.

FIG. 2 is a schematic for explaining process of adding CRC redundancy bits/ECC redundancy bits to data stored in the rescue sector and data generation. A data size that the standard sector stores is 1024 bytes and a data size that the rescue sector stores is 512 bytes, as an example, in FIG. 2.

The storage device calculates, as shown in a first row of FIG. 2, CRC redundancy bits (B) and ECC redundancy bits (C) based on 512 bytes of user data (A) recorded on the rescue sector (CRC redundancy bits and ECC redundancy bits are fundamentally calculated based on 1024 bytes of user data recorded on the standard sector).

As shown in a second row of FIG. 2, the storage device combines user data (A), CRC redundancy bits (B), and ECC redundancy bits (C) in a recording buffer memory incorporated in the storage device.

As shown in a third row of FIG. 2, the storage device sets the damping ratio M to 2 and records user data (A), in the rescue sector, to which CRC redundancy bits (B) and ECC redundancy bits (C) are added based on the number of control recording clocks F2 that is half of the number of standard recording clocks F1.

As shown in a fourth row of FIG. 2, when reproducing user data stored in the rescue sector, user data (A), CRC redundancy bits (B), and ECC redundancy bits (C) stored in the rescue sector are read in a reproducing buffer memory incorporated in the storage device and, after correction of an error in user data (A), are combined with user data output before or after the user data (A).

Figure 3:
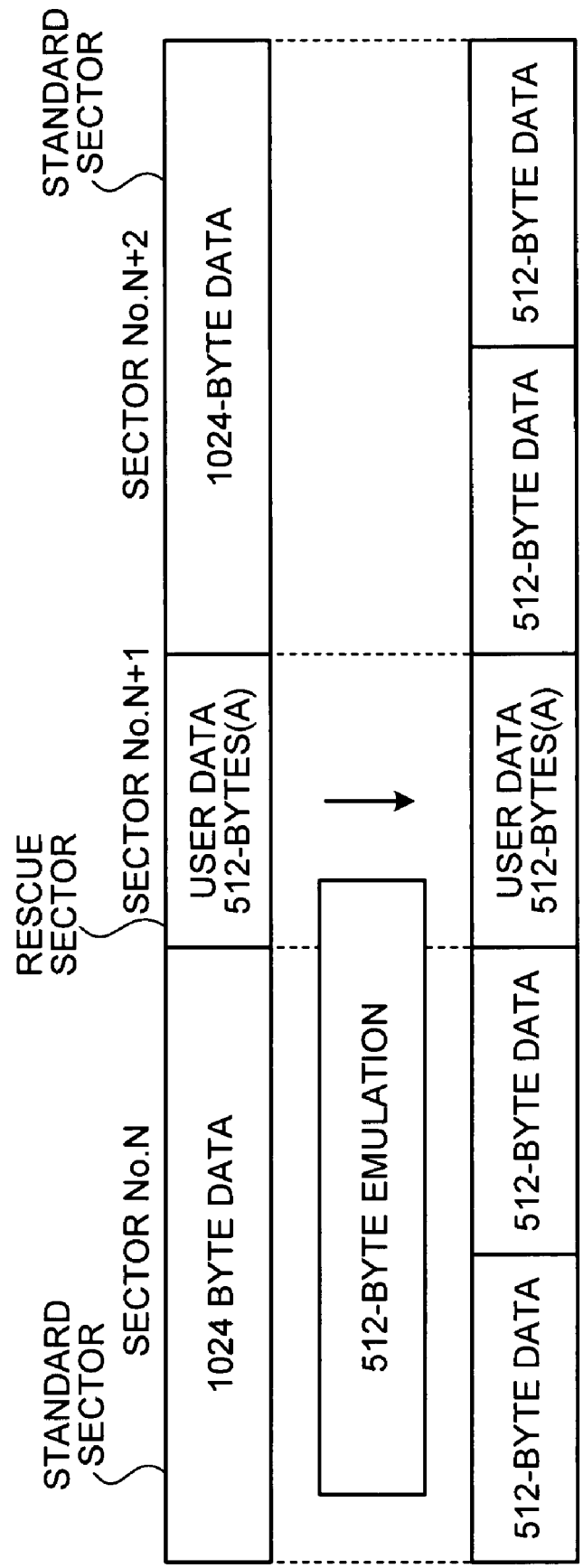
FIG. 3 is a schematic for explaining a combination of data on a standard sector and that on a rescue sector.

FIG. 3 is a schematic for explaining a combination of data on the standard sector and that on the rescue sector. A data size that the standard sector stores is 1024 bytes and a data size that the rescue sector stores is 512 bytes, as an example, in FIG. 3.

As shown in FIG. 3, when the standard sector that stores 1024-byte data (N-th sector and N+second sector) is combined before and after the rescue sector (N+first sector) that stores 512-byte data, the storage device records and reproduces data on an assumption that each sector is divided for each 512 bytes. In other words, one standard sector that stores 1024-byte data is used as two sectors that store 512-byte data. Thus, the storage device supposedly treats data that is stored by each sector as 512 bytes so that recording and reproducing data with respect to a recording medium can be simply processed.

Information about the rescue sector is stored on the storage medium as an alternating-process control table. FIG. 4 is an example of contents of the alternating-process control table according to the first embodiment. The alternating process control table information such as bad sector identification (ID) number, data specifying process, and damping ratio.

The bad sector ID number is data to locate a bad sector on a storage medium. The data specifying process is stored data that indicates the content of process with respect to a bad sector identified by the bad sector ID number. When the data specifying process specifies rescue process, rescue process is performed for a bad sector and the bad sector is used as the rescue sector. When the data specifying process specifies slipping process, slipping process is performed for a bad sector and it is impossible to record data to the bad sector. The damping ratio indicates data of the damping ratio M in performing rescue process.

Figure 5:
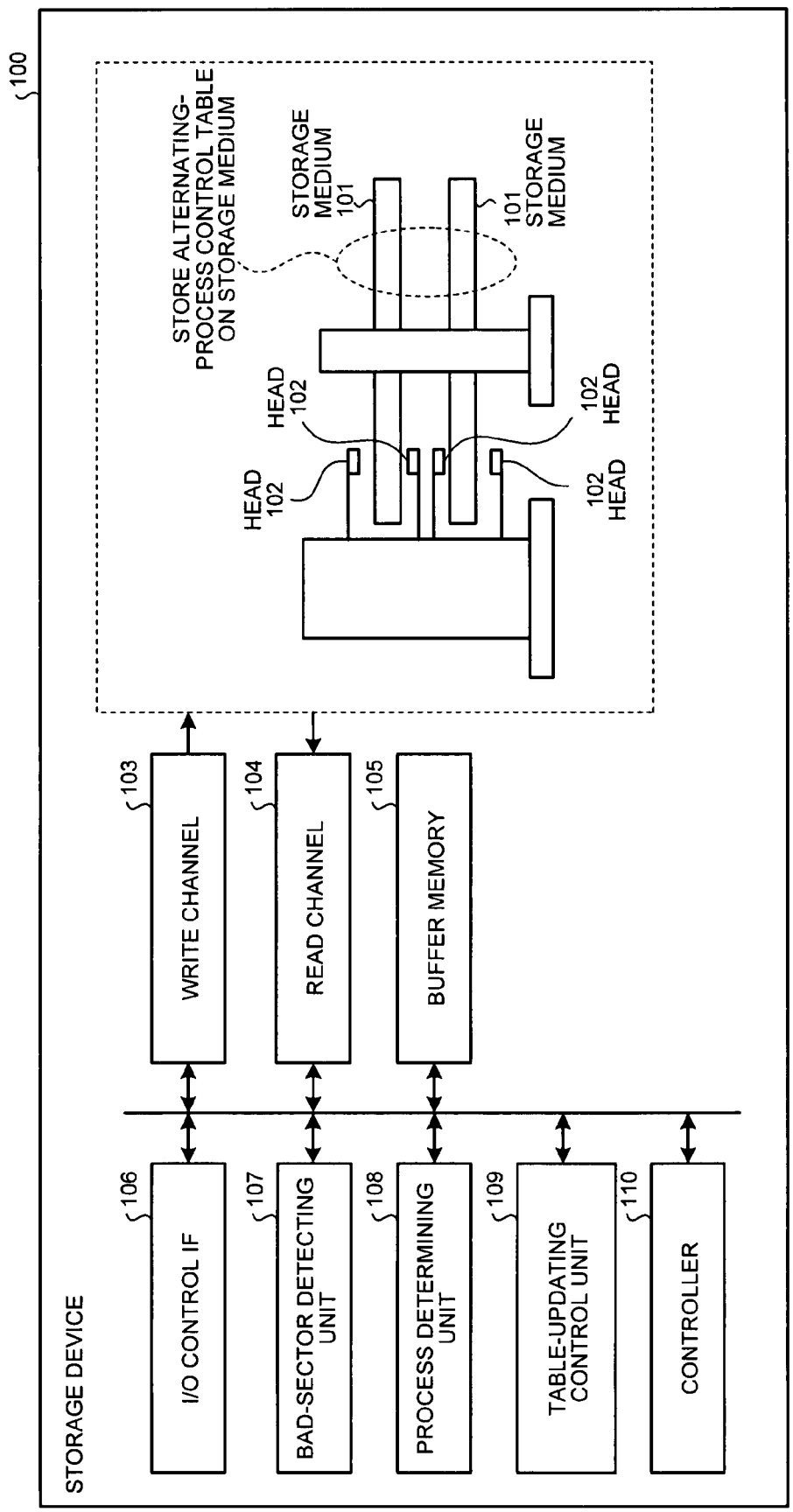
FIG. 5 is a functional block diagram of the storage device according to the first embodiment.

FIG. 5 is a functional block diagram of a storage device 100 according to the first embodiment. The storage device 100 includes a storage medium 101, a head 102, a write channel 103, a read channel 104, a buffer memory 105, an input-output (I/O) control interface (IF) 106, a bad-sector detecting unit 107, a process determining unit 108, a table-updating control unit 109, and a controller 110.

The storage medium 101 is a thin disk that is made of glass, metal such as aluminum, or resin and that is coated with a film of magnetic material or material that has optical transition as recording characteristic. The storage device 100 records or deletes data below by changing a magnetic condition of magnetic material. Physical formatting is performed to form sectors that are divided for each of predetermined bytes in the storage medium 101 (for example, see FIG. 1). The storage medium 101 stores the alternating-process control table at a predetermined storage area (see FIG. 4).

The head 102 records data with respect to the storage medium 101 based on the number of recording clocks (the number of standard recording clocks or the number of control recording clocks) in response to the damping ratio and reproduces data stored in the storage medium 101 based on the number of reproducing clocks (the number of standard reproducing clocks or the number of control reproducing clocks) in response to the damping ratio.

The write channel 103, when acquiring data to record in the storage medium 101, outputs the acquired data to the head 102. The read channel 104, when acquiring reproduced data from the storage medium 101 through the head 102, outputs the acquired data to various processing units in the storage device 100.

The buffer memory 105 temporarily stores data recorded on or reproduced from the storage medium 101 and corresponds to the recording buffer memory and reproducing buffer memory shown in FIG. 2. The I/O control IF 106 performs data communication with a host computer (not shown).

When physical formatting is performed with respect to the storage medium 101 through the controller 110, the bad-sector detecting unit 107 records data for testing to the storage medium 101 based on the number of standard recording clocks to detect a bad sector.

Any system that the bad-sector detecting unit 107 detects a bad sector can be used. For example, the bad-sector detecting unit 107 records data for testing to each standard sector to detect an error rate when reproducing data for testing from each standard sector. The bad-sector detecting unit 107 detects the standard sector in which the detected error rate is a reference value or more as a bad sector and outputs an ID number of the detected bad sector (bad sector ID number) to the process determining unit 108. Alternatively, if an error cannot be corrected, the bad-sector detecting unit 107 detects the standard sector as a bad sector and full-replacement process according to the first embodiment is performed. It is below indicated that the bad-sector detecting unit 107 detects a bad sector based on an error rate. However, if en error cannot be corrected, the bad-sector detecting unit 107 can detect the standard sector as a bad sector.

The process determining unit 108 determines whether to perform rescue process or slipping process for a bad sector. Rescue process means to lower a recording density of a bad sector and use the bad sector as a rescue sector by recording data to the bad sector based on the number of control recording clocks.

On the other hand, slipping process means to make a bad sector unusable. The process determining unit 108 outputs a bad sector ID number and the determination result of the bad sector corresponding to the bad sector ID number to the controller 110 and to the table-updating control unit 109. If the determination result is rescue process, the damping ratio M corresponding to rescue process is also output.

The table-updating control unit 109 updates the alternating-process control table stored in the storage medium 101 based on data acquired from the process determining unit 108 (bad sector ID number, determination result, damping ratio M (only when the determination result is rescue process)). The alternating-process control table stored in the storage medium 101 is recorded based on the number of standard recording clocks.

The controller 110 controls the entire storage device 100 and performs various processes (recording and reproducing data with respect to the storage medium 101, physical formatting, and full-replacement process that is explained in FIGS. 2 and 3). The controller 110 performs rescue process or slipping process on a bad sector of the storage medium 101 based on the determination result output from the process determining unit 108. The controller 110 also controls the number of reproducing clocks when data stored in the storage medium is reproduced based on the alternating-process control table stored in the storage medium 101 and reproduces data stored in the storage medium 101 based on the number of controlled reproducing clocks (the number of standard reproducing clocks or the number of control reproducing clocks).

When data is recorded on the standard sector or in the rescue sector, the controller 110 calculates CRC redundancy bits or ECC redundancy bits based on the data, and adds the calculated redundancy bits to the data to record it on the sector.

Figure 6:
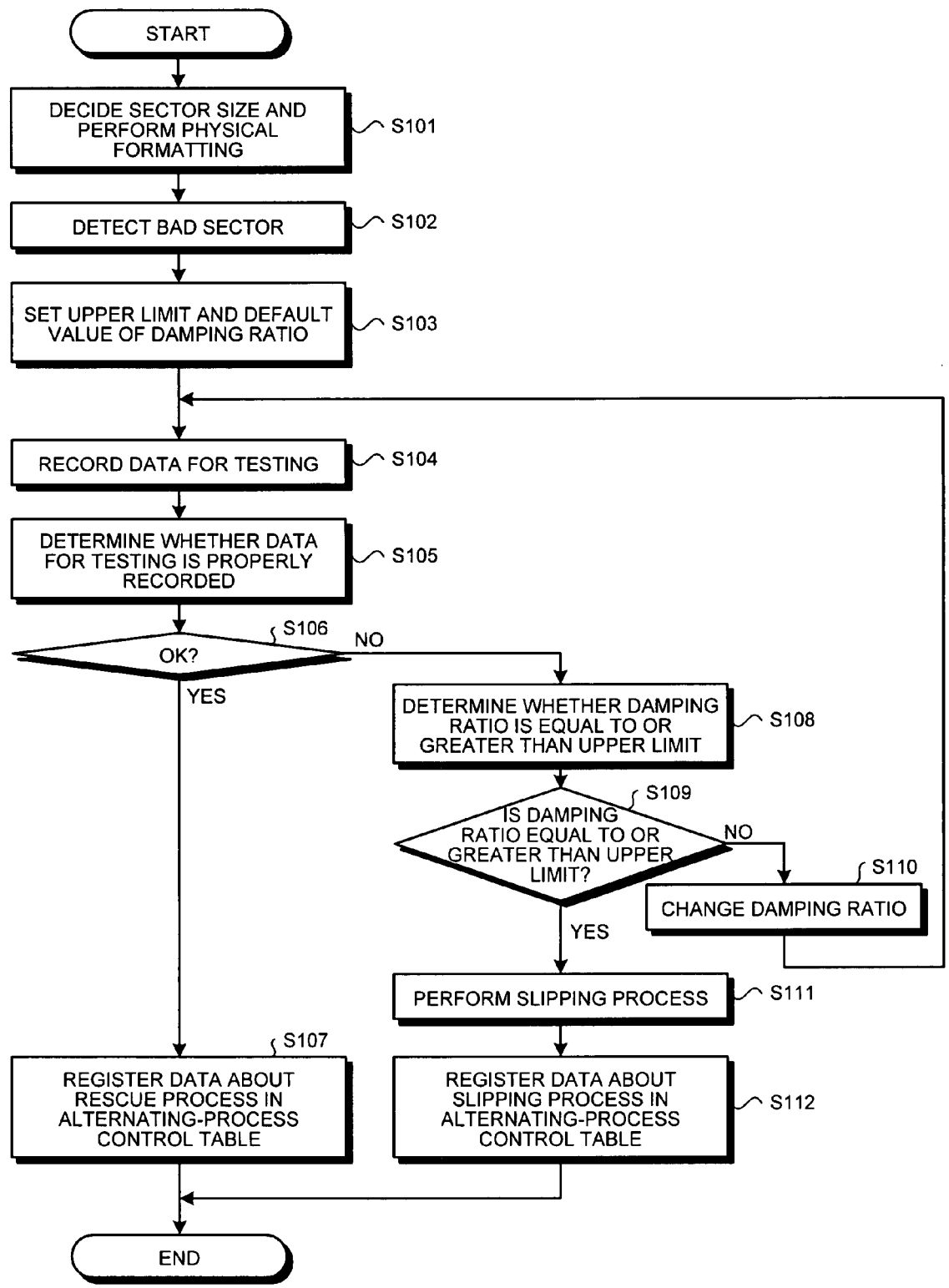
FIG. 6 is a flowchart of the operation of the storage device according to the first embodiment.

FIG. 6 is a flowchart of the operation of the storage device 100. As shown in FIG. 6, the controller 110 determines a sector size of the standard sector, performs physical formatting (step S101), and the bad-sector detecting unit 107 detects a bad sector in the storage device 100 (step S102).

The process determining unit 108 sets an upper limit and a default value of the damping ratio (step S103). At step S103, the process determining unit 108 sets an upper limit of the damping ratio based on the sector size of the standard sector set at step S101. More specifically, the process determining unit 108 set $2^n$ to satisfy the size of the standard sector=512 bytes×$2^n$ as the upper limit of the damping ratio. For example, when the size of the standard sector is 1024, the process determining unit 108 sets the upper limit of the damping ratio as 2 ($512\times2^1=1024$). Thus, the upper limit of the damping ratio is set so that at least 512-byte data is recorded on the rescue sector. The process determining unit 108 sets 1 as a default value of the damping ratio.

Then, the controller 110 records data for testing in a bad sector (step S104) and the process determining unit 108 determines whether data for testing is properly recorded on the bad sector (step S105). At step S105, after the process determining unit 108 records data for testing in the bad sector, the process determining unit 108 detects an error rate when reproducing data recorded on the bad sector and determines that data for testing is properly recorded when the detected error rate is less than a predetermined value.

When the data for testing is properly recorded (Yes at step S106), the table-updating control unit 109 records data about alternating process in the alternating-process control table (step S107). More specifically, the table-updating control unit 109 records a bad sector ID number of a bad sector (rescue sector) to which rescue process is performed, data specifying process (here, rescue process), and the damping ratio in the alternating-process control table of the storage medium 101 at step S107.

On the other hand, when the data for testing is not properly recorded (No at step S106), the process determining unit 108 determines whether the currently-set damping ratio is equal to or greater than the upper limit (step S108). When the damping ratio is less than the upper limit (No at step S109), the damping ratio is changed (step S110) and the process returns to step S104. The process determining unit 108 regards a value obtained by multiplying the currently-set damping ratio by 2 as the changed damping ratio at step S110.

When the currently-set damping ratio is equal to or greater than the upper limit (Yes at step S109), the controller 110 performs slipping process (step S111), and the table-updating control unit 109 records data about slipping process in the alternating-process control table (step S112). More specifically, the table-updating control unit 109 records a bad sector ID number of a bad sector to which slipping process is performed and data specifying process (here, slipping process) in the alternating-process control table of the storage medium 101 at step S112.

Accordingly, the process determining unit 108 changes the damping ratio and the controller 110 rescues a bad sector based on the number of control recording clocks, leading to an effective utilization of a bad sector.

As described above, when the bad-sector detecting unit 107 detects a bad sector in the storage device 100 according to the first embodiment, the process determining unit 108 determines whether rescue process is performed to a bad sector. When performing rescue process, the process determining unit 108 controls the damping ratio, the table-updating control unit 109 records various information in the alternating-process control table, and the controller 110 records and reproduces data with respect to the rescue sector based on the alternating-process control table. This makes it possible to effectively utilize a bad sector and prevent a storage capacity from decreasing due to a bad sector at the minimum.

Characteristics of a storage device according to a second embodiment of the present invention are explained with reference to FIG. 7 while being compared with a conventional technology. In the second embodiment, an explanation is given of, but not limited to, a case where each sector size is 1024 bytes when physical formatting is performed for a storage medium (for example, a magnetic disk).

Figure 7:
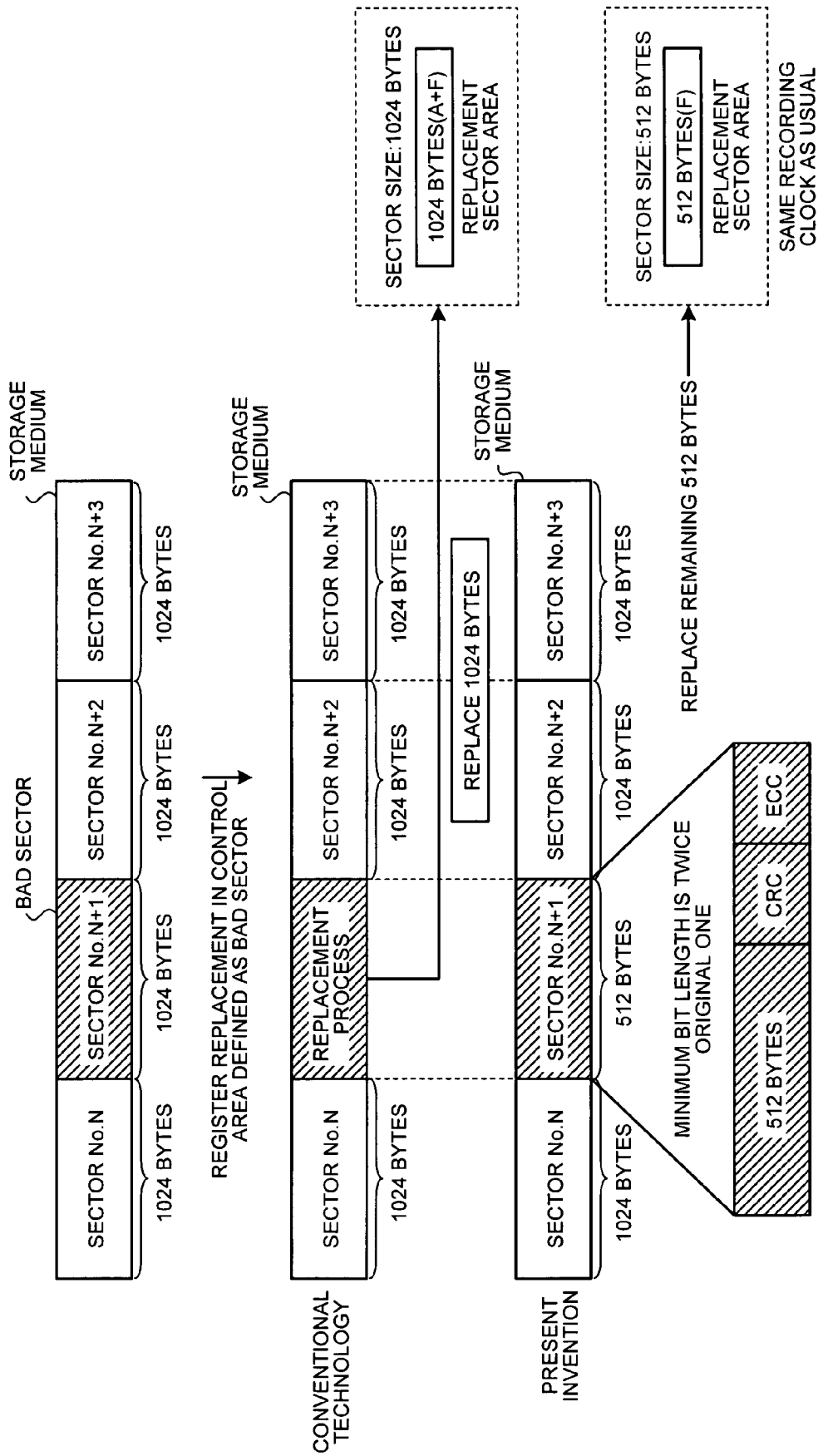
FIG. 7 is a schematic for explaining characteristics of a storage device according to a second embodiment of the present invention.

When a bad sector is detected from the storage medium in the conventional storage device in user's use (when physical formatting has been completed with respect to the storage medium and user data is recorded/reproduced with respect to the storage medium), after data stored in the bad sector is stored in a replacement sector area (that is previously secured on the storage medium to temporarily save data stored in the bad sector) to rescue data stored in the bad sector, the bad sector is regarded as unusable (see a second row in FIG. 7).

However, the more bad sectors, the much smaller area of the storage medium that can be used in the conventional technology because the detected bad sector is regarded as unusable while a user uses the device.

On the other hand, the storage device according to the second embodiment records data in a bad sector at a lower recording density than that of a normal sector (hereinafter, a standard sector) when a bad sector is detected in user's use, and records only part of the data that cannot be recorded on the bad sector in the replacement sector area. For example, when a recording density of a bad sector is reduced and 512-byte data is stored in the bad sector, the remaining 512-byte data is stored in the replacement sector area (see a third row in FIG. 7). Hereinafter, a bad sector that stores part of data as a replace target by reducing a recording density is depicted as a replacement rescue sector.

When the storage device according to the second embodiment records data (that is part of data as a replace target) in a bad sector, the device controls the number of recording clocks to store data to a small value. Hereinafter, the number of recording clocks to store data in a bad sector is depicted as the number of control recording clocks (in the same manner as in the first embodiment).

When the number of recording clocks in recording data in the standard sector is regarded as F1 and the number of control recording clocks is regarded as F2, it is possible to represent F2=F1/M. When a data capacity stored in the standard sector based on the number of standard recording clocks F1 is regarded as D1 byte and a data capacity stored in the bad sector (replacement rescue sector) based on the number of control recording clocks F2 is regarded as D2 byte, it is possible to represent D2=D1/M.

M contained in the formula indicates the damping ratio in the number of recording clocks. The larger damping ratio M, the smaller number of control recording clocks and the less data capacity stored in the replacement rescue sector. A numeral value of $2^n$ (n: a positive integer) is substituted for the damping ratio M.

For example, when the size of each standard sector is 1024 bytes and the damping ratio is set to 2, 512-byte data is stored in the replacement rescue sector and 512-byte data is stored in the replacement sector area (data is stored in the replacement sector area based on the number of standard recording clocks).

Thus, the storage device according to the second embodiment stores data in a bad sector (replacement rescue sector) based on the number of control recording clocks at the time of detection of a bad sector while a user uses the device and records the remaining data in the replacement sector area. If a bad sector is detected while a user uses the device, it is possible to effectively use a bad sector and save a storage capacity in the replacement sector area.

The number of reproducing clocks for reproducing data stored in the standard sector (hereinafter, standard reproducing clocks) is the same as the number of standard recording clocks F1. The number of reproducing clocks for reproducing data stored in the replacement rescue sector (hereinafter, control reproducing clocks) is the same as the number of control recording clocks F2 for recording data on the replacement rescue sector.

Figure 8:
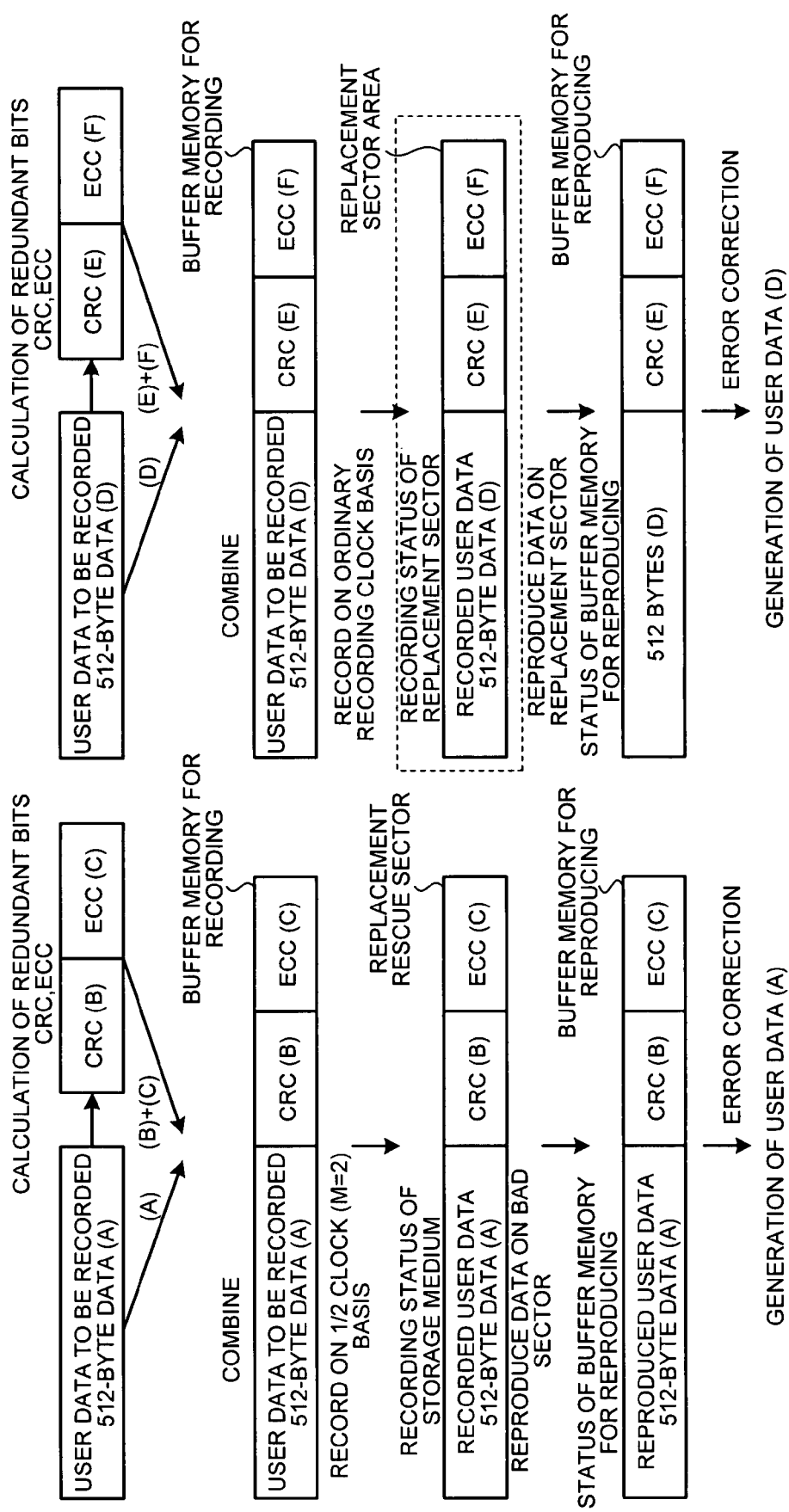
FIG. 8 is a schematic for explaining process of adding CRC redundancy bits/ECC redundancy bits to data recorded on a replacement rescue sector and a replacement sector area and data generation.

FIG. 8 is a schematic for explaining process of adding CRC redundancy bits/ECC redundancy bits to data recorded on the replacement rescue sector and the replacement sector area and data generation. A data size stored in the standard sector is 1024 bytes and a data size stored in the replacement rescue sector is 512 bytes as an example in FIG. 8.

As shown on the left side of a first row in FIG. 8, the storage device calculates CRC redundancy bits (B) and ECC redundancy bits (C) based on 512 bytes of user data (A) stored in the replacement rescue sector (CRC redundancy bits and ECC redundancy bits are fundamentally calculated based on 1024 bytes of user data stored in the standard sector).

As shown on the left side of a second row in FIG. 8, the storage device combines user data (A), CRC redundancy bits (B), and ECC redundancy bits (C) in a recording buffer memory that is incorporated in the storage device.

As shown on the left side of a third row in FIG. 8, the storage device sets the damping ratio M to 2 and records, in the replacement rescue sector, user data (A) to which CRC redundancy bits (B) and ECC redundancy bits (C) are added based on the number of control recording clocks F2 that is a half of the number of standard recording clocks F1.

As shown on the left side of a fourth row in FIG. 8, when reproducing user data (A) stored in the replacement rescue sector, user data (A), CRC redundancy bits (B), and ECC redundancy bits (C) stored in the replacement rescue sector are read into the reproducing buffer memory that is incorporated in the storage device. After correcting an error in user data (A), they are coupled with user data (D) stored in the replacement sector area.

On the other hand, as shown on the right side of the first row in FIG. 8, the storage device calculates CRC redundancy bits (E) and ECC redundancy bits (F) based on 512 bytes of user data (D) stored in the replacement sector area (CRC redundancy bits and ECC redundancy bits are fundamentally calculated based on 1024 bytes of user data stored in the standard sector).

As shown on the right side of the second row in FIG. 8, the storage device combines user data (D), CRC redundancy bits (E), and ECC redundancy bits (F) in the recording buffer memory that is incorporated in the storage device.

As shown on the right side of the third row in FIG. 8, the storage device records, in the replacement sector area, user data (D) to which CRC redundancy bits (E) and ECC redundancy bits (F) are added based on the number of standard recording clocks F1.

As shown on the right side of the fourth row in FIG. 8, when reproducing user data (D) stored in the replacement sector area, user data (D), CRC redundancy bits (E), and ECC redundancy bits (F) stored in the replacement sector area are read into the reproducing buffer memory that is incorporated in the storage device. After correcting an error in user data (D), they are coupled with user data (A) stored in the replacement rescue sector.

Figure 9:
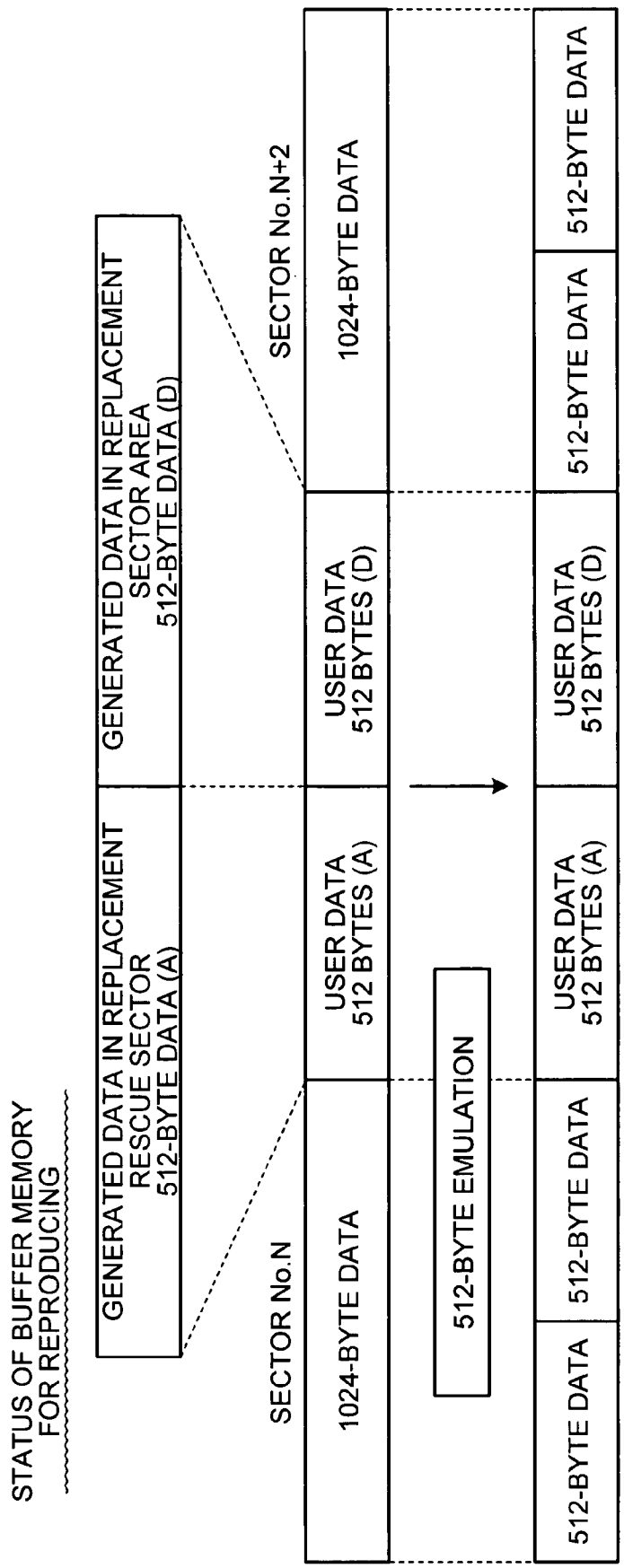
FIG. 9 is a schematic for explaining a combination of user data (A) stored in the replacement rescue sector and user data (D) stored in the replacement sector area.

FIG. 9 is a schematic for explaining a combination of user data (A) stored in the replacement rescue sector and user data (D) stored in the replacement sector area. As shown in FIG. 9, user data (A) stored in the replacement rescue sector and user data (D) stored in the replacement sector area are first coupled in the reproducing buffer memory (see FIG. 8 with regard to a method of reading user data from the replacement rescue sector and the replacement sector area).

When a sector number of the replacement rescue sector is N+1, user data (A) and user data (D) in the reproducing buffer memory are coupled between a sector number N of standard sector and a sector number N+2 of standard sector.

When the standard sector that stores 1024-byte data is coupled before or after the replacement rescue sector that stores 512-byte data, the storage device records and reproduces data on an assumption that each of the sectors is divided for each 512 bytes. That is, one standard sector that stores 1024-byte data is dealt with as two sectors that store 512-byte data. This makes it possible for the storage device to simply record and reproduce data with respect to a storage medium by supposedly dealing with data stored in each sector as 512 bytes.

In FIGS. 7 and 9, 1024-byte data is recorded on the standard sector and data is recorded based on the damping ratio 2 in the replacement rescue sector. When S byte of data is recorded on the standard sector and the damping ratio is M, S/M byte of data is recorded on the replacement rescue sector and the remaining (S-S/M) byte of data is recorded in the replacement sector area.

Information about the replacement rescue sector is recorded on a storage medium as an alternating-process control table. FIG. 10 is an example of contents of the alternating-process control table according to the second embodiment. As shown in FIG. 10, the alternating-process control table contains information such as bad sector ID number, data specifying process, replacement sector ID number, and damping ratio.

The bad sector ID number identifies a position of a bad sector on a storage medium. The data specifying process indicates the content of process performed for a bad sector identified by the bad sector ID number. When the data specifying process specifies partial replacement process, replacement process is partially performed for a bad sector. When the data specifying process specifies full-replacement process, the whole data stored in the bad sector is recorded in the replacement sector area. The replacement sector ID number is an ID number of a sector to which data is replaced. The damping ratio indicates the damping ratio M when performing partial replacement process.

Figure 11:
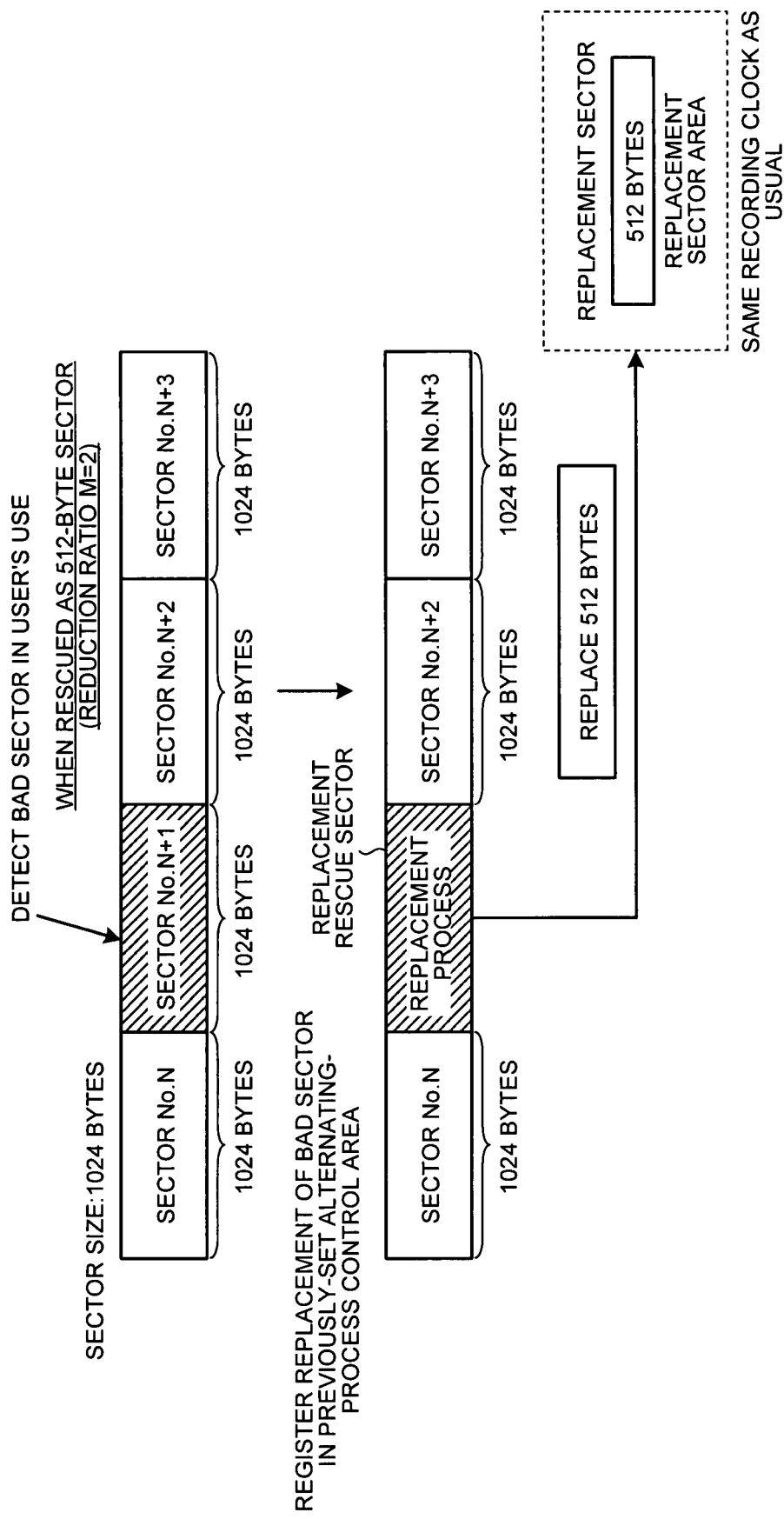
FIG. 11 is a schematic for explaining partial replacement process.

FIG. 11 is a schematic for explaining partial replacement process. A data size that the standard sector stores is 1024 bytes and a data size that the replacement rescue sector stores is 512 bytes (damping ratio is 2) as an example in FIG. 11.

As shown in FIG. 11, when a bad sector is detected in a sector number N+1 and partial replacement process is performed thereto, 512-byte data is recorded on a bad sector (replacement rescue sector) based on the number of control recording clocks of the damping ratio 2 and the remaining 512-byte data is recorded on the replacement sector based on the number of standard recording clocks.

Figure 12:
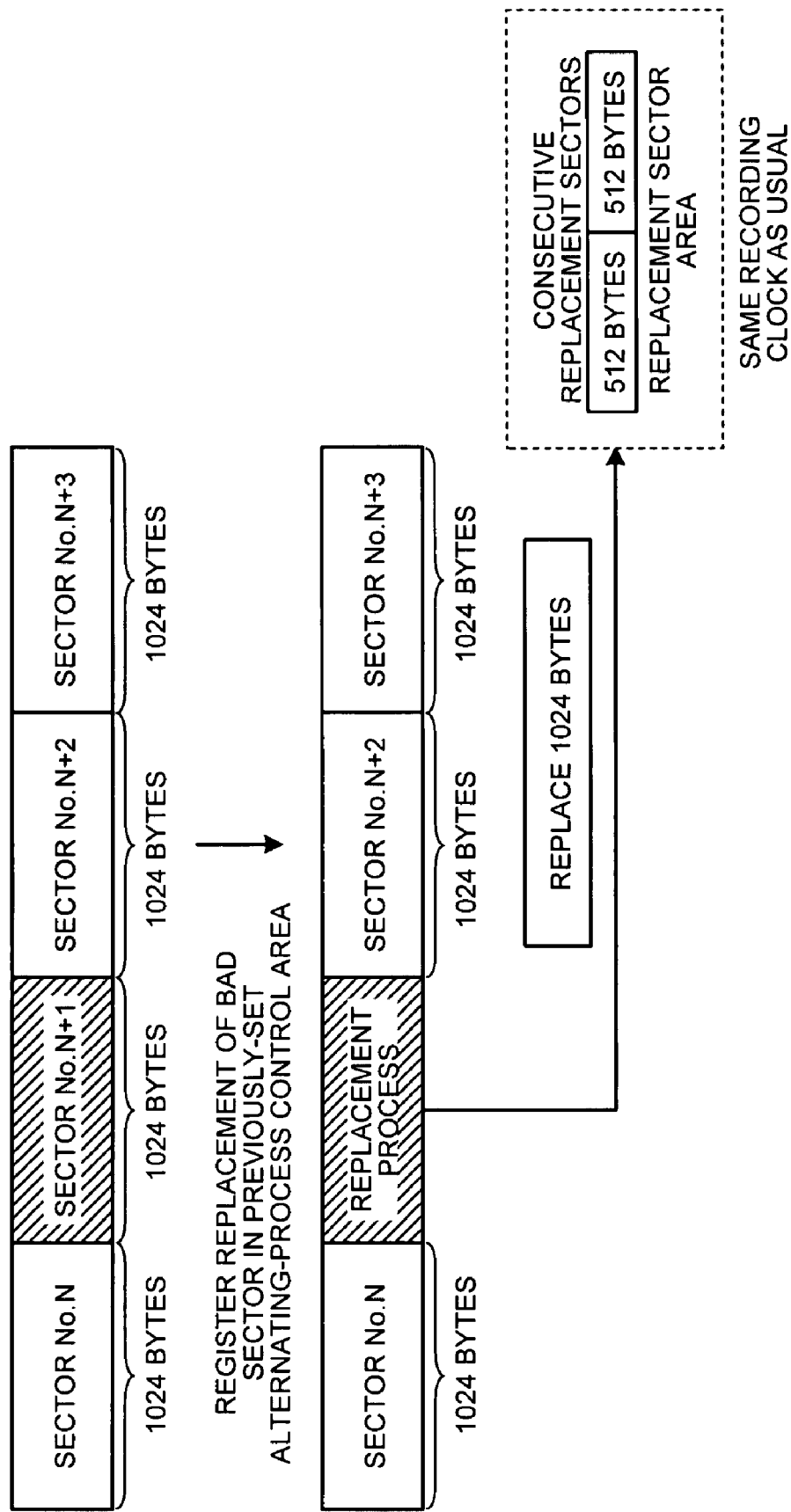
FIG. 12 is a schematic for explaining full-replacement process.

FIG. 12 is a schematic for explaining full-replacement process. A data size that the standard sector stores is 1024 bytes as an example in FIG. 12. When a bad sector is detected in a sector number N+1 and full-replacement process is performed thereto, 1024-byte data is divided into 512-byte data. The 512-byte data is recorded on the consecutive replacement sectors.

Thus, when performing full-replacement process, it is possible to easily perform full-replacement process of supposedly reading every 512-byte data (512-byte emulation) stored in the storage medium by dividing data into every 512 bytes without directly storing 1024-byte data in the replacement sector.

Figure 13:
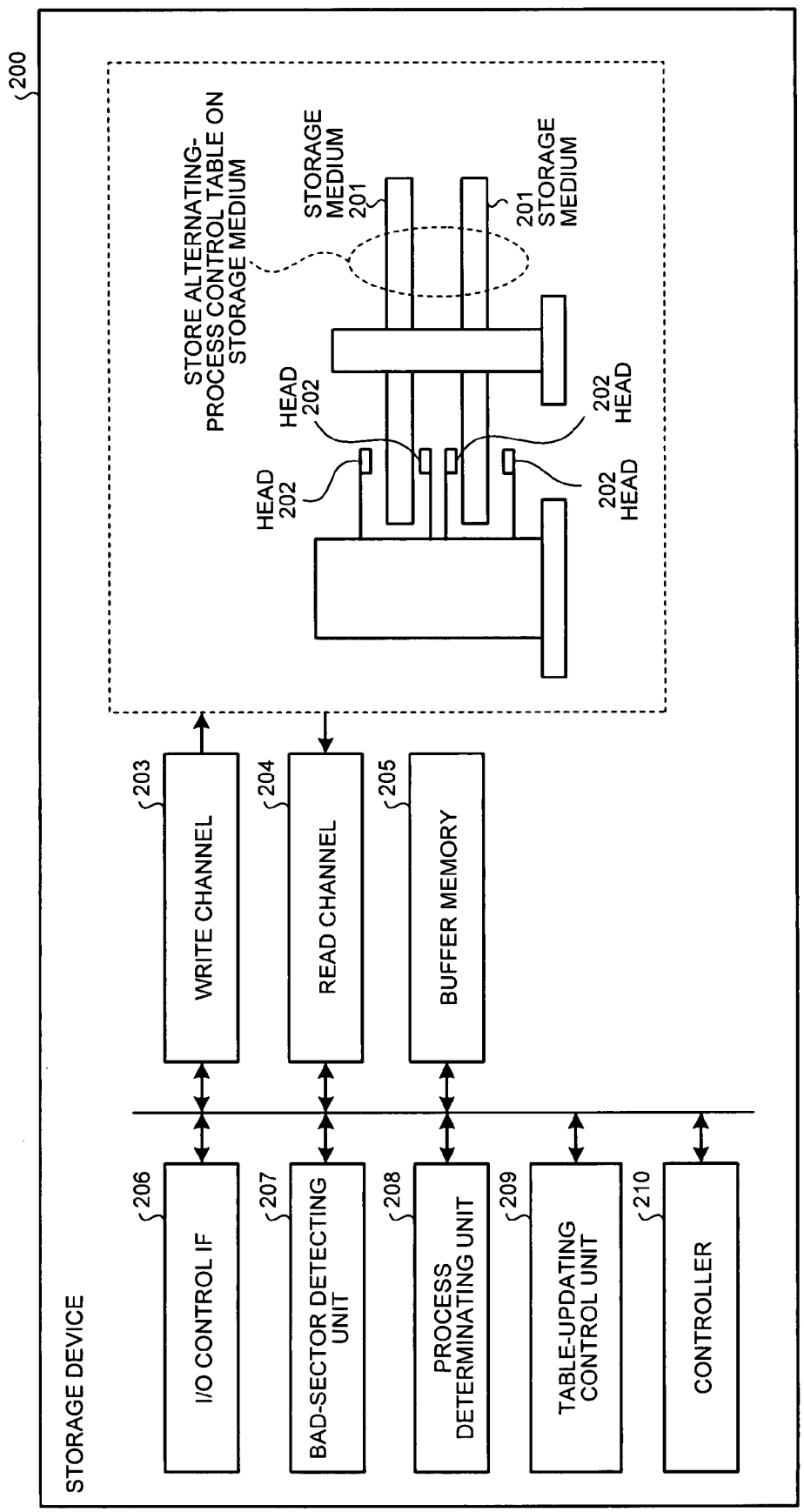
FIG. 13 is a functional block diagram of the storage device according to the second embodiment.

FIG. 13 is a functional block diagram of a storage device 200 according to the second embodiment. The storage device 200 includes a storage medium 201, a head 202, a write channel 203, a read channel 204, a buffer memory 205, an I/O control IF 206, a bad-sector detecting unit 207, a process determining unit 208, a table-updating control unit 209, and a controller 210.

The storage medium 201, head 202, write channel 203, read channel 204, buffer memory 205, I/O control IF 206 are basically similar to the storage medium 101, the head 102, the write channel 103, the read channel 104, the buffer memory 105, the I/O control IF 106 of the storage device 100 in the first embodiment, and the same explanation is not repeated.

The bad-sector detecting unit 207, process determining unit 208, table-updating control unit 209, and controller 210 perform the same full-replacement process (rescue process, slipping process) as the bad-sector detecting unit 107, process determining unit 108, table-updating control unit 109, and controller 110 of the storage device 100 in the first embodiment as basic full-replacement process and also perform additional full-replacement process as characteristic part of the storage device 200 according to the second embodiment. Full-replacement process in the bad-sector detecting unit 207, the process determining unit 208, the table-updating control unit 209, and the controller 210 is explained below in turn. The same explanation as previously described for each of the units 107 to 110 of the storage device 100 according to the first embodiment is not repeated.

The bad-sector detecting unit 207 detects a bad sector based on an error rate of a sector on the storage medium and on a fact that an error cannot be corrected when the controller 210 records and reproduces data on the storage medium 201 in user's use.

Any system that the bad-sector detecting unit 207 detects a bad sector can be used. For example, the bad-sector detecting unit 207 detects an error rate when reproducing user data from each standard sector. The bad-sector detecting unit 207 detects the standard sector in which the detected error rate is a reference value or more and in which an error cannot be corrected as a bad sector and outputs an ID number of the detected bad sector (bad sector ID number) to the process determining unit 208.

The process determining unit 208 determines which is performed to a bad sector, partial replacement process or full-replacement process. Partial replacement process means to record data on the bad sector based on the number of control recording clocks and to store the remaining data that cannot be recorded on the bad sector in the replacement sector area (see FIG. 11).

On the other hand, full-replacement process divides data stored in the bad sector for each 512 bytes and stores the divided data in the consecutive replacement sectors (see FIG. 12). The process determining unit 208 outputs a bad sector ID number, a determination result corresponding to the bad sector ID number, and a replacement sector ID number to the controller 210 and to the table-updating control unit 209. When the determination result indicates partial replacement process, the damping ratio M corresponding to partial replacement process is also output.

The table-updating control unit 209 updates the alternating-process control table stored in the storage medium 201 based on data obtained from the process determining unit 208 (bad sector ID number, determination result, replacement sector ID number, and damping ratio (only when the determination result indicates partial replacement process)). The alternating-process control table stored in the storage medium 201 is recorded based on the number of standard recording clocks.

The controller 210 controls the storage device 200 and performs various processes (such as recording and reproducing with respect to the storage medium 201). The controller 210 performs partial replacement process or full-replacement process based on the determination result output from the process determining unit 208. The controller 210 controls the number of reproducing clocks when reproducing data stored in the storage medium based on the alternating-process control table stored in the storage medium 201 and reproduces data stored in the storage medium 201 based on the number of controlled reproducing clocks (the number of standard reproducing clocks or the number of control reproducing clocks).

Figure 14:
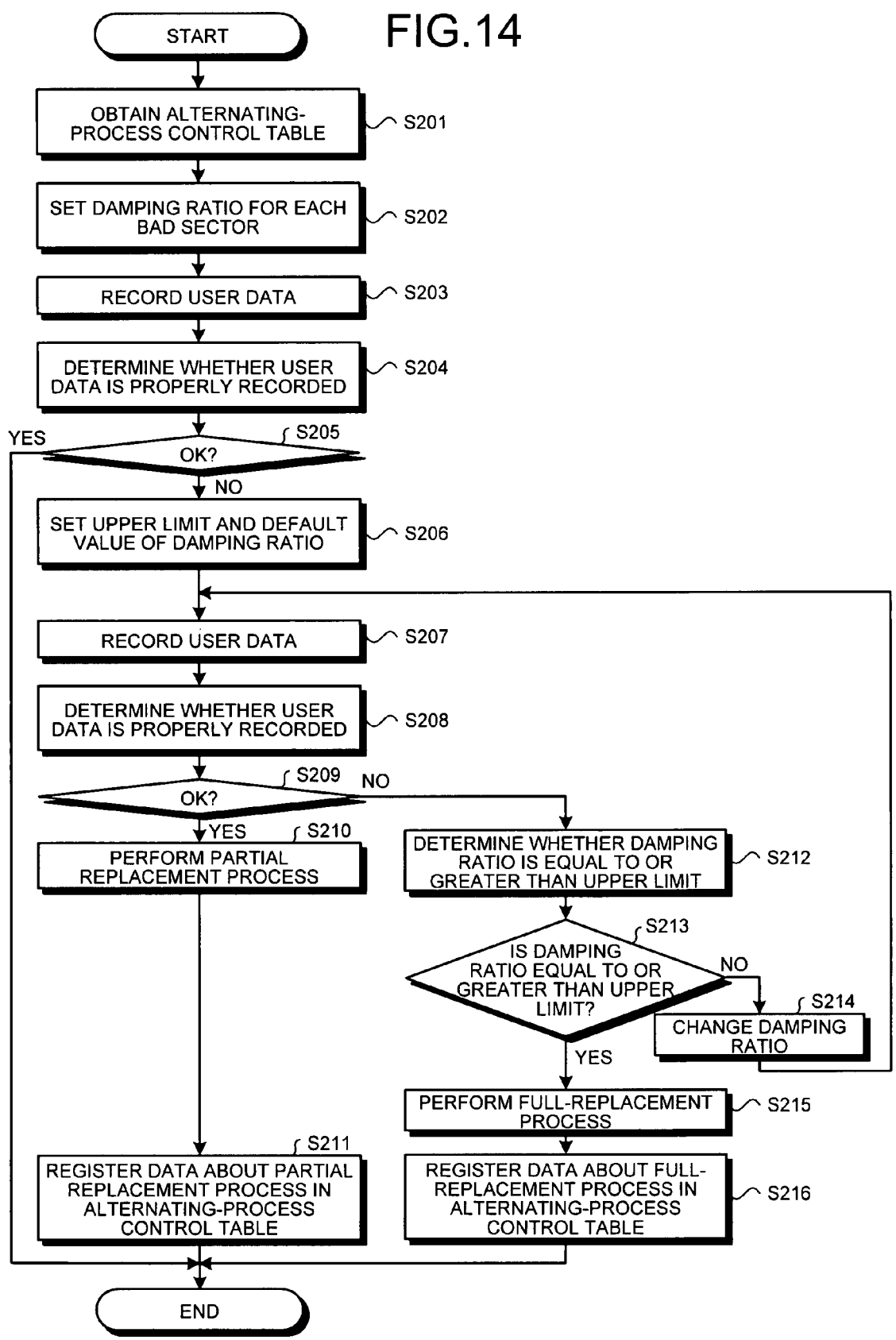
FIG. 14 is a flowchart of the operation of the storage device according to the second embodiment.

FIG. 14 is a flowchart of the operation of the storage device 200 according to the second embodiment. As shown in FIG. 14, the controller 210 obtains the alternating-process control table on the storage medium 201 (step S201) and sets the damping ratio for each bad sector (step S202) in the storage device 200.

The controller 210 records user data in the storage medium 201 (step S203), and the bad-sector detecting unit 207 determines whether the user data is properly recorded (step S204). When the user data is properly recorded (Yes at step S205), the full-replacement process ends without change.

On the other hand, when the user data is not properly recorded (No at step S205), the process determining unit 208 sets an upper limit and a default value of the damping ratio (step S206). At step S206, the process determining unit 208 sets $2^n$ to satisfy the size of a standard sector=512 bytes×$2^n$ (n: a positive integer) as the upper limit of the damping ratio. For example, when the size of the standard sector is 1024 bytes, the process determining unit 208 sets the upper limit of the damping ratio as 2 (512×$2^1$=1024). Thus, the upper limit of the damping ratio is set so that at least 512-byte data is recorded on the replacement rescue sector. The process determining unit 208 sets 1 as a default value of the damping ratio.

The controller 210 records user data in the bad sector (step S207), and the process determining unit 208 determines whether the user data is properly recorded on the bad sector (step S208). At step S208, after the process determining unit 208 records the user data in the bad sector, the process determining unit 208 detects an error rate when reproducing data recorded on the bad sector and determines that the user data is properly recorded when the detected error rate is less than a predetermined value.

When the user data is properly recorded (Yes at step S209), the process determining unit 208 performs partial replacement process (step S210). At step S210, when the controller 210 performs partial replacement process, user data is recorded on the replacement rescue sector based on the number of control recording clocks and the remaining data that cannot be recorded is recorded on the replacement sector area.

The table-updating control unit 209 registers data about partial replacement process in the alternating-process control table (step S211). More specifically, at step S211, the table-updating control unit 209 records information about the bad sector ID number of the bad sector (replacement rescue sector) to which partial replacement process is performed, data specifying process (here, partial replacement process), replacement sector ID number, and damping ratio in the alternating-process control table of the storage medium 201.

On the other hand, when the user data is not properly recorded (No at step S209), the process determining unit 208 determines whether the currently-set damping ratio is equal to or greater than the upper limit (step S212). When the damping ratio is less than the upper limit (No at step S213), the damping ratio is changed (step S214) and the full-replacement process returns to step S207. At step S214, the process determining unit 208 uses a value obtained by multiplying the currently-set damping ratio by 2 as the changed damping ratio.

When the currently-set damping ratio is equal to or greater than the upper limit (Yes at step S213), the process determining unit 208 performs full-replacement process (step S215) and the table-updating control unit 209 records data about full-replacement process in the alternating-process control table (step S216). At step S216, the table-updating control unit 209 records a sector ID number of a bad sector to which full-replacement process is performed, data specifying process (here, full-replacement process) in the alternating-process control table of the storage medium 201.

Thus, the process determining unit 208 changes the damping ratio and the controller 210 uses part of the bad sector based on the number of control recording clocks and records the remaining data in the replacement sector area, thereby leading to effective utilization of limited resources on the storage medium.

As described above, when the bad-sector detecting unit 207 detects a bad sector in user's use in the storage device 200 according to the second embodiment, the process determining unit 208 determines which is performed to the bad sector, partial replacement process or full-replacement process. When performing partial replacement process, the process determining unit 208 controls the damping ratio and the table-updating control unit 209 records various information in the alternating-process control table and the controller 210 records data in the replacement rescue sector based on the number of control recording clocks and the remaining data is recorded in the replacement sector area. This makes it possible to effectively use a bad sector and prevent reduction of a storage capacity due to a bad sector at the minimum.

When the process determining unit 208 determines, in the storage device 200 according to the second embodiment, that full-replacement process is performed, data as a replace target is divided for each 512 bytes and each of the divided data is recorded on the consecutive replacement sectors, thereby effectively performing 512-byte emulation.

In the first and second embodiments, the standard sector of 1024 bytes is explained by way of example and without limitation, the standard sector can be of 512×$2^n$ (n: a positive integer) bytes such as 2048 bytes, 4096 bytes, 8192 bytes, and the like.

When the standard sector is of 2048 bytes and a sector size predetermined in an operating system (OS) is 512 bytes, the process determining units 108 and 208 can set the damping ratio M to 2 or 4.

(When the standard sector is 2048 bytes and the damping ratio M is 2)

When the size of the standard sector is 2048 bytes and the damping ratio M is set to 2, 1024-byte data is stored in a bad sector (rescue sector, replacement rescue sector) based on the number of control recording clocks. The controller 210 previously performs physical formatting to make a sector size of a replacement sector area 1024 and records 1024-byte data on the replacement sector based on the number of standard recording clocks. When reading the supposedly divided data from the replacement sector area (performing emulation), the controller 210 reads data for each 512 bytes even when data stored in the replacement sector is 1024 bytes.

(When the standard sector is 2048 bytes and the damping ratio M is 4)

When the size of the standard sector is 2048 bytes and the damping ratio M is set to 4, 512-byte data is stored in a bad sector (rescue sector, replacement rescue sector) based on the number of control recording clocks. The controller 210 previously performs physical formatting to make a sector size of a replacement sector area 512 and records 1536-byte data in the replacement sector based on the number of standard recording clocks. When recording 1536-byte data in the replacement sector, 1536-byte data is divided for each 512 bytes and the divided 512-byte data are recorded on the consecutive replacement sectors. When reading the supposedly divided data from the replacement sector area (performing emulation), the controller 210 reads data for each 512 bytes even when data stored in the replacement sector is 1536 bytes.

When the size of the standard sector is 4096 bytes and a sector size predetermined in OS is 512 bytes, the process determining units 108 and 208 can set the damping ratio M to 2, 4, or 8.

FIG. 15 is a table for explaining a relation among sizes of data recorded on a rescue sector, a replacement rescue sector, and a replacement sector for standard sector sizes of 1024, 2048, and 4096 bytes and damping ratios of 2, 4, and 8.

For example, a relation when the standard sector is 1024 bytes and the damping ratio is 1 is shown on a first row in FIG. 15. When the number of passing bytes is 1024 on the same row, it is shown that 1024-byte data is recorded on a sector and slipping process is not performed. When 512-byte data is recorded on the replacement rescue sector on the same row, 512-byte data is recorded on the replacement sector. The other explanation about FIG. 15 is omitted.

Hitherto, embodiments of the present invention have been explained and various embodiments of the present invention can be implemented other than the first and second embodiments. The other embodiments contained in the present invention are explained below as a third embodiment of the present invention.

(1) Storing the Alternating-Process Control Table in a Nonvolatile Memory

Figure 16:
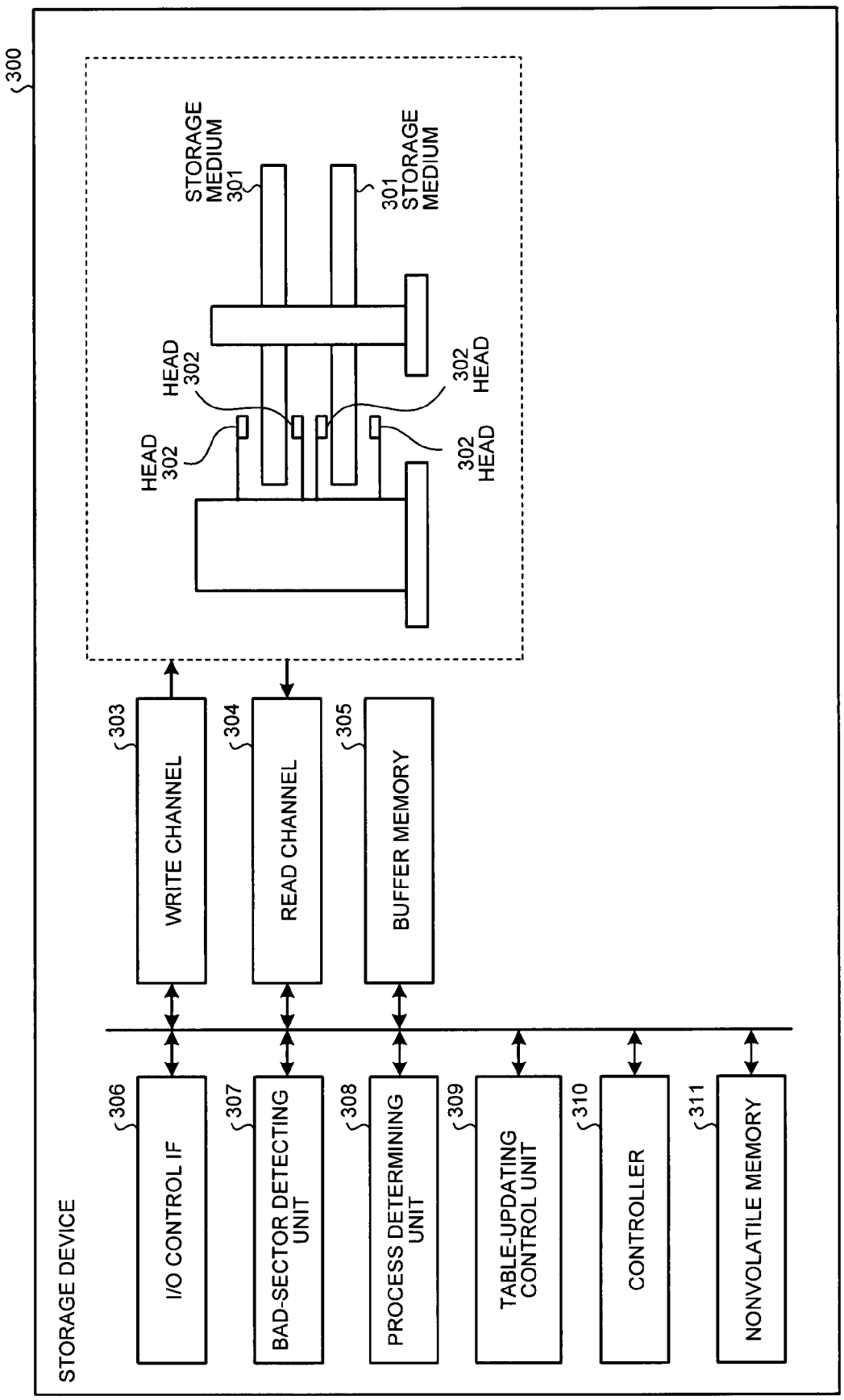
FIG. 16 is a functional block diagram of a storage device according to another embodiment of the present invention.

The alternating-process control table is stored in, but not limited to, the storage medium in the first and second embodiments (see FIGS. 4 and 10). The alternating-process control table can be stored in a nonvolatile memory of the storage device. FIG. 16 is a functional block diagram of a storage device 300 according to another embodiment of the present invention.

The storage device 300 includes a storage medium 301, a head 302, a write channel 303, a read channel 304, a buffer memory 305, an I/O control IF 306, a bad-sector detecting unit 307, a process determining unit 308, a table-updating control unit 309, a controller 310, and a nonvolatile memory 311.

The storage medium 301, the head 302, the write channel 303, the read channel 304, the buffer memory 305, the I/O control IF 306, the bad-sector detecting unit 307, the process determining unit 308, and the controller 310 are basically similar to the storage medium 201, the head 202, the write channel 203, the read channel 204, the buffer memory 205, the I/O control IF 206, the bad-sector detecting unit 207, the process determining unit 208, and the controller 210 shown in FIG. 13, and the same explanation is not repeated.

The table-updating control unit 309 updates the alternating-process control table stored in the nonvolatile memory 311 based on data obtained from the process determining unit 308 (bad sector ID number, determination result, damping ratio M (only when the determination result indicates rescue process or partial replacement process), a replacement sector ID number (only when the determination result indicates partial replacement process or full-replacement process)).

FIG. 17 is an example of contents of the alternating process control table stored in the nonvolatile memory 311. As shown in FIG. 17, the alternating process control table contains information such as bad sector ID number, data specifying process, replacement sector ID number, and damping ratio.

The bad sector ID number is data to locate a bad sector on the storage medium. The data specifying process indicates the content of process performed for a bad sector identified by the bad sector ID number. When the data specifying process specifies rescue process, rescue process is performed for a bad sector and the bad sector is used as a rescue sector. When the data specifying process specifies slipping process, slipping process is performed for a bad sector and it is impossible to record data in the bad sector.

When the data specifying process specifies partial replacement process, partial replacement process is performed for a bad sector. When the data specifying process specifies full-replacement process, the whole data stored in the bad sector is stored in the replacement sector area. The replacement sector ID number is an ID number of a sector to which data is replaced. The damping ratio indicates the damping ratio M when rescue process and partial replacement process are performed.

Thus, the alternating-process control table is stored in the nonvolatile memory 311 so that it is possible to access the alternating-process control table earlier than when the alternating-process control table is stored in the storage medium, hence enhancing full-replacement process efficiency in the storage device.

(2) Storing the Alternating-Process Control Table in the Removable Nonvolatile Memory (User Key)

Figure 18:
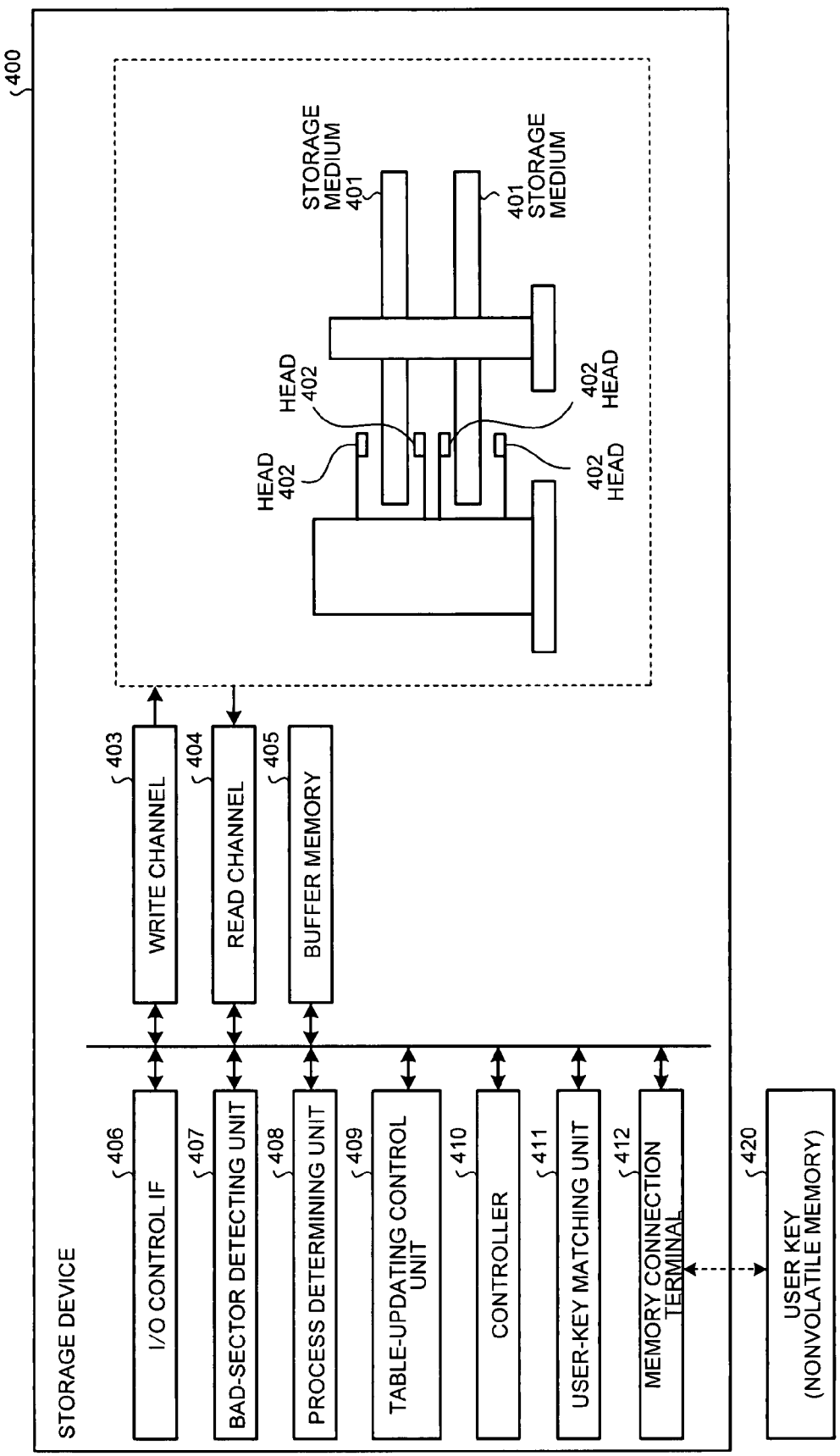
FIG. 18 is a functional block diagram of a storage device according to still another embodiment of the present invention.

The alternating-process control table (see FIGS. 4 and 10) is stored in, but not limited to, the storage medium in the first and second embodiments. The alternating-process control table can be stored in the nonvolatile memory that is removable from the storage device. FIG. 18 is a functional block diagram of a storage device 400 according to another embodiment of the present invention.

The storage device 400 includes a storage medium 401, a head 402, a write channel 403, a read channel 404, a buffer memory 405, an I/O control IF 406, a bad-sector detecting unit 407, a process determining unit 408, a table-updating control unit 409, a controller 410, a user-key matching unit 411, and a memory connecting terminal 412. A user key (nonvolatile memory) 420 stores a storage device name identifier that identifies the storage device and the alternating-process control table that corresponds to the storage device, which are associated with each other.

Figure 19:
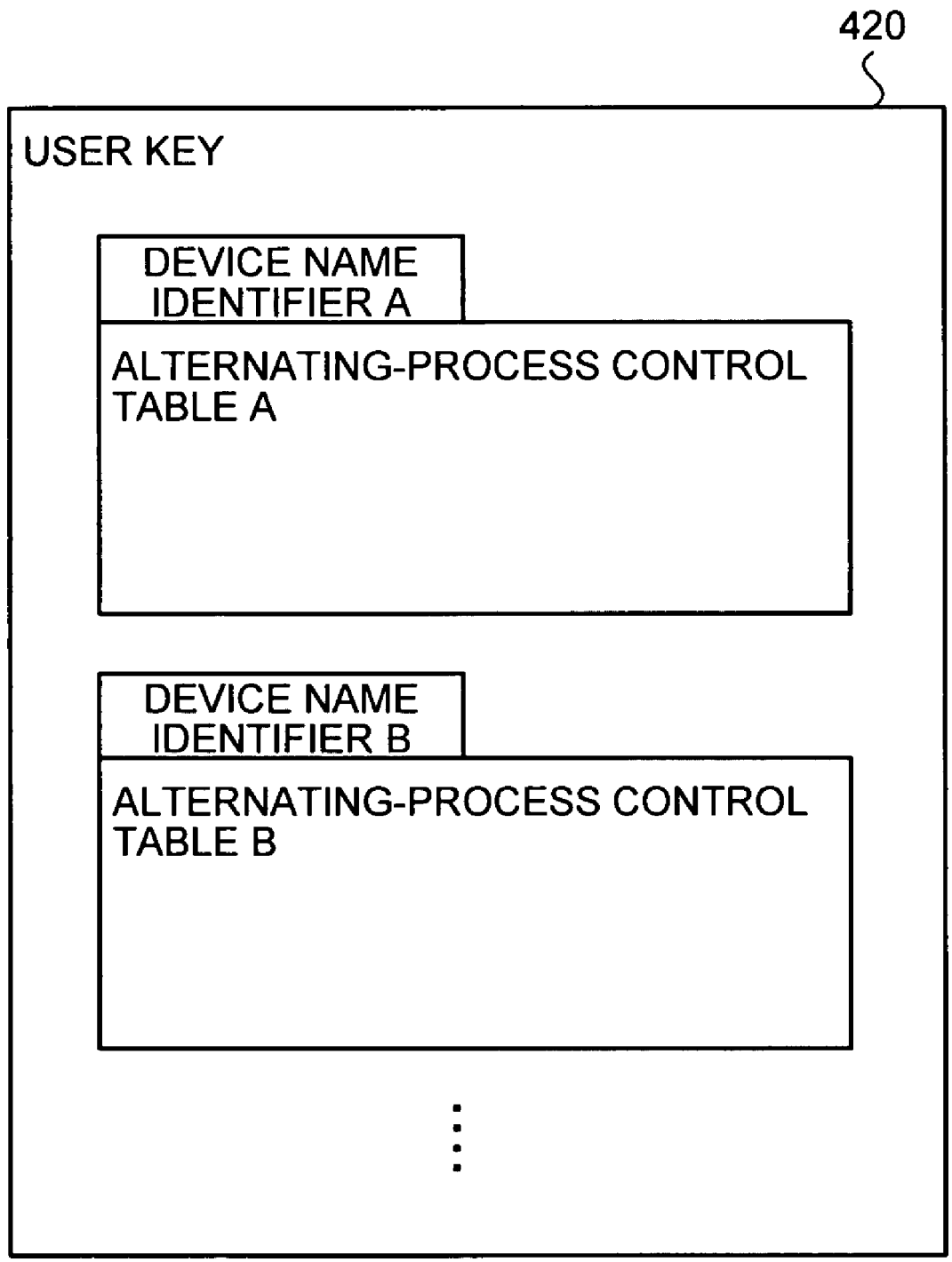
FIG. 19 is an example of data stored in a user key.

FIG. 19 is an example of data stored in the user key 420. As shown in FIG. 19, the user key 420 stores therein the storage device name identifier and the alternating-process control table, which are associated with each other. The data structure of the alternating-process control table is the same as that of the alternating-process control table shown in FIG. 17, and the explanation is omitted. The user key 420 stores an alternating-process control table for each storage device.

Returning to FIG. 18, the storage medium 401, the head 402, the write channel 403, the read channel 404, the buffer memory 405, the I/O control IF 406, the bad-sector detecting unit 407, the process determining unit 408, and the controller 410 are basically similar to the storage medium 201, the head 202, the write channel 203, the read channel 204, the buffer memory 205, the I/O control IF 206, the bad-sector detecting unit 207, the process determining unit 208, and the controller 210 shown in FIG. 13, and the same explanation is not repeated.

The table-updating control unit 409 updates the alternating-process control table stored in the user key 420. More specifically, the table-updating control unit 409 updates the alternating-process control table (that corresponds to the storage device 400) based on data obtained from the process determining unit 408 (bad sector ID number, determination result, damping ratio M (only when the determination result indicates rescue process or partial replacement process), a replacement sector ID number (only when the determination result indicates partial replacement process or full-replacement process)).

The table-updating control unit 409 accesses the alternating-process control table that corresponds to the storage device name identifier of the storage device 400 stored in the user key 420 and sequentially updates such alternating-process control table.

The user-key matching unit 411 compares the storage device name identifier of the storage device 400 (that the user-key matching unit 411 has) with the storage device name identifier stored in the user key 420 and determines whether the storage device name identifiers match each other. When the storage device name identifier of the storage device 400 and the storage device name identifier stored in the user key 420 do not match each other, the user-key matching unit 411 prohibits data recorded in the user key 420 from being transmitted to the storage device 400. In addition, when the storage device name identifier of the storage device 400 and the storage device name identifier stored in the user key 420 do not match each other, the user-key matching unit 411 can prohibit the storage device 400 from activating.

The memory connecting terminal 412 connects the user key 420 to the storage device 400. The user key 420 is connected to the memory connecting terminal 412 so that the storage device 400 can access the alternating-process control table stored in the user key 420.

Figure 20:
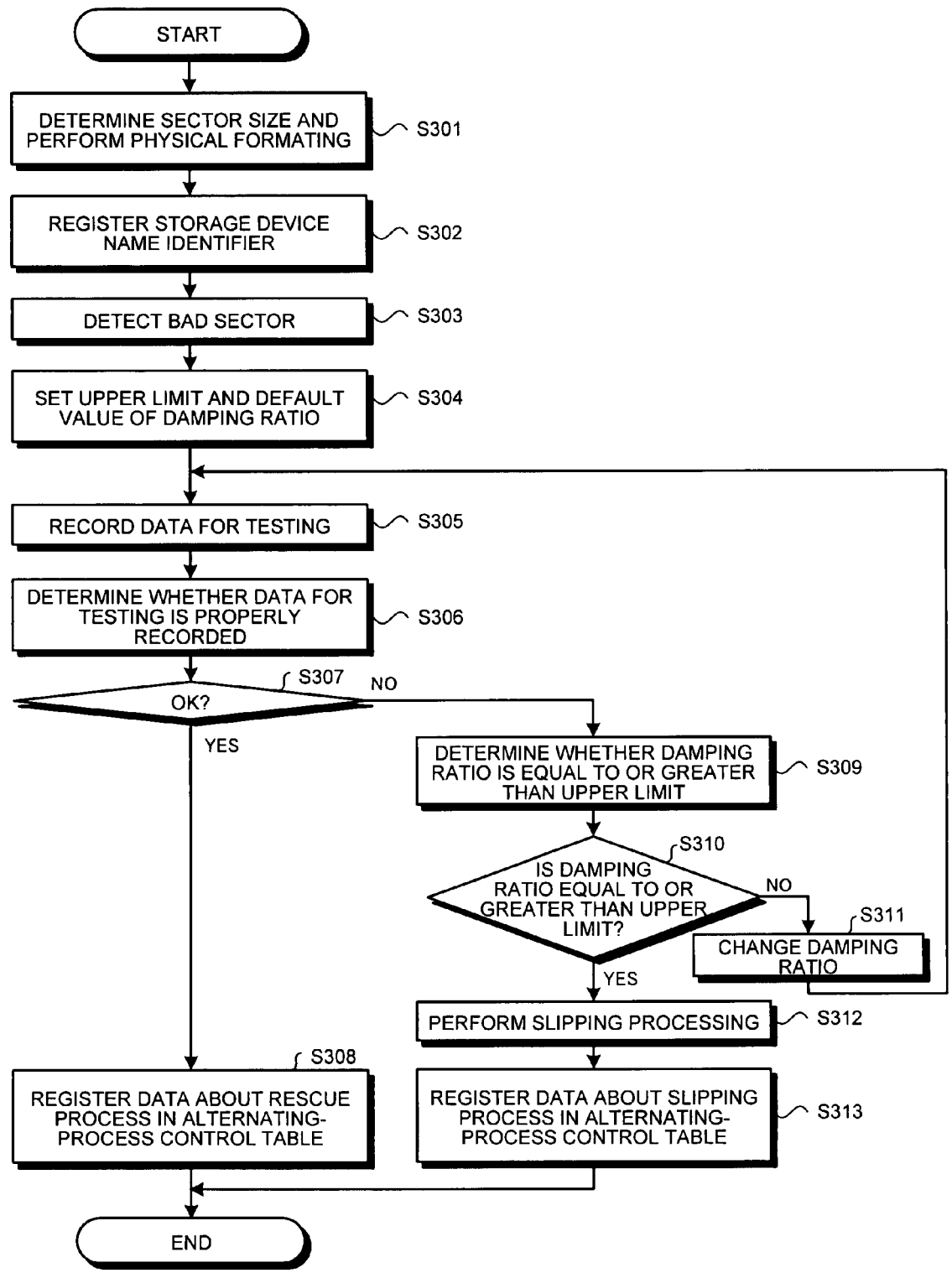
FIG. 20 is a flowchart of physical formatting process performed in the storage device.

FIG. 20 is a flowchart of physical formatting process performed in the storage device 400. As shown in FIG. 20, the controller 410 determines a sector size of the standard sector to perform physical formatting (step S301), registers the storage device name identifier in the user key 420 (step S302) and the bad-sector detecting unit 407 detects a bad sector in the storage device 400 (step S303).

The process determining unit 408 sets an upper limit and a default value of the damping ratio (step S304). At step S304, the process determining unit 408 set the upper limit of the damping ratio based on a sector size of the standard sector that is set at step S301. More specifically, the process determining unit 408 sets $2^n$ (n: a positive integer) to satisfy the size of the standard sector=512 bytes×$2^n$ as the upper limit of the damping ratio. For example, when the size of the standard sector is 1024 bytes, the process determining unit 408 sets the upper limit of the damping ratio as 2 ($512\times2^1=1024$). Thus, the upper limit of the damping ratio is set so that at least 512-byte data is recorded on the rescue sector. The process determining unit 408 sets 1 as an initial unit of the damping ratio.

Then, the controller 410 records data for testing in a bad sector (step S305) and the process determining unit 408 determines whether data for testing is properly recorded on the bad sector (step S306). At step S306, after the process determining unit 408 records data for testing in the bad sector, the process determining unit 408 detects an error rate when reproducing data recorded on the bad sector and determines that data for testing is properly recorded when the detected error rate is less than a predetermined value.

When the data for testing is properly recorded (Yes at step S307), the table-updating control unit 409 makes data about alternating process correspond to the storage device name identifier and records the resulting data in the alternating-process control table of the user key 420 (step S308). More specifically, the table-updating control unit 409 records a bad sector ID number of a bad sector (rescue sector) to which rescue process is performed, data specifying process (here, rescue process), and the damping ratio in the alternating-process control table of the user key 420 at step S308.

On the other hand, when the data for testing is not properly recorded (No at step S307), the process determining unit 408 determines whether the currently-set damping ratio is equal to or greater than the upper limit (step S309). When the damping ratio is less than the upper limit (No at step S310), the damping ratio is changed (step S311) and the full-replacement process returns to step S305. The process determining unit 408 regards a value obtained by multiplying the currently-set damping ratio by 2 as the changed damping ratio at step S311.

When the currently-set damping ratio is equal to or greater than the upper limit (Yes at step S310), the controller 410 performs slipping process (step S312), and the table-updating control unit 409 records data about slipping process in the alternating-process control table of the user key 420 (step S313). More specifically, the table-updating control unit 409 records the bad sector ID number of a bad sector to which slipping process is performed and data specifying process (here, slipping process) in the alternating-process control table of the user key 420 at step S313.

Figure 21:
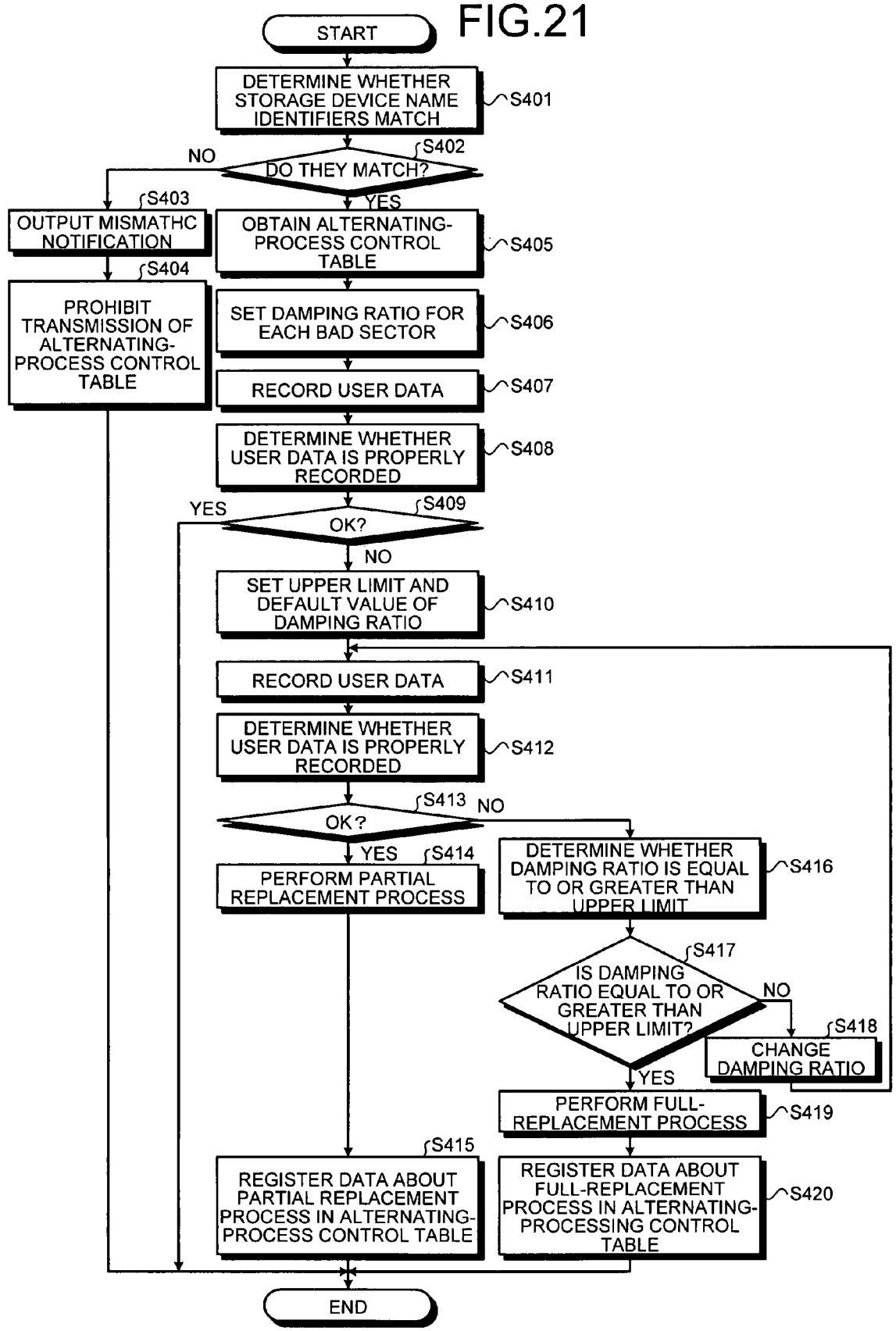
FIG. 21 is a flowchart of replacement process performed in the storage device.

FIG. 21 is a flowchart of replacement process performed in the storage device 400. As shown in FIG. 21, the user-key matching unit 411 of the storage device 400 determines whether the storage device name identifier stored in the user key matches the storage device name identifier of the storage device 400 (step S401). When the storage device name identifiers do not match each other (No at step S402), a mismatch notification is output to the controller 410 (step S403), and the alternating-process control table stored in the user key 420 is prohibited from being transmitted (step S404).

On the other hand, when the storage device name identifiers match each other (Yes at step S402), the controller 410 obtains the alternating-process control table in the user key 420 (step S405), and the damping ratio is set for each bad sector (step S406).

The controller 410 records user data in the storage medium 401 (step S407), and the bad-sector detecting unit 407 determines whether user data is properly recorded (step S408). When the user data is properly recorded (Yes at step S409), the full-replacement process ends without change.

On the other hand, when the user data is not properly recorded (No at step S409), the process determining unit 408 sets an upper limit and a default value of the damping ratio (step S410). At step S410, the process determining unit 408 sets $2^n$ to satisfy the size of the standard sector=512 bytes×$2^n$ (n: a positive integer) as the upper limit of the damping ratio. For example, when the size of the standard sector is 1024 bytes, the process determining unit 408 sets the upper limit of the damping ratio as 2 ($512\times2^1=1024$). Thus, the upper limit of the damping ratio is set so that at least 512-byte data is recorded on the replacement rescue sector. The process determining unit 408 sets 1 as a default value of the damping ratio.

The controller 410 records user data in the bad sector (step S411), and the process determining unit 408 determines whether the user data is properly recorded on the bad sector (step S412). At step S412, after the process determining unit 408 records the user data in the bad sector, the process determining unit 408 detects an error rate when reproducing data recorded on the bad sector and determines that the user data is properly recorded when the detected error rate is less than a predetermined value.

When the user data is properly recorded (Yes at step S413), the process determining unit 408 performs partial replacement process (step S414). At step S414, when the controller 410 performs partial replacement process, user data is recorded on the replacement rescue sector based on the number of control recording clocks and the remaining data that cannot be recorded is recorded in the replacement sector area.

The table-updating control unit 409 registers data about partial replacement process in the alternating-process control table (step S415). More specifically, at step S415, the table-updating control unit 409 records information about a bad sector ID number of a bad sector (replacement rescue sector) to which partial replacement process is performed, data specifying process (here, partial replacement process), a replacement sector ID number, and a damping ratio in the alternating-process control table of the user key 420.

On the other hand, when the user data is not properly recorded (No at step S413), the process determining unit 408 determines whether the currently-set damping ratio is equal to or greater than the upper limit (step S416). When the damping ratio is less than the upper limit (No at step S417), the damping ratio is changed (step S418), and the full-replacement process returns to step S411. At step S418, the process determining unit 408 uses a value obtained by multiplying the currently-set damping ratio by 2 as the changed damping ratio.

When the currently-set damping ratio is equal to or greater than the upper limit (Yes at step S417), the process determining unit 408 performs full-replacement process (step S419) and the table-updating control unit 409 registers data about full-replacement process in the alternating-process control table (step S420). At step S420, the table-updating control unit 409 records a sector ID number of a bad sector to which full-replacement process is performed, data specifying process (here, full-replacement process) in the alternating-process control table of the user key 420.

Thus, it is possible to realize a new security measure by storing the alternating-process control table in the user key 420. In other words, the alternating-process control table that is indispensable to record and reproduce data with respect to the storage medium 401 is a personal key and, if a third party that does not have the personal key incorrectly activates the storage device, data stored in the storage medium 401 cannot be reproduced.

When the alternating-process control table stored in the user key does not correspond to the storage device 400, there is a likelihood of destroying data in the storage device 400. To prevent the likelihood, when the user key 420 is first connected to the storage device, the storage device name identifier that the user-key matching unit 411 has is registered to the user key 420. When a set of the storage device 400 and the user key 420 is sold, it is convenient that the storage device name identifier and the alternating-process control table are stored in the user key in advance. Alternatively, the storage device 400 can encipher data stored in the user key 420.

Figure 22:
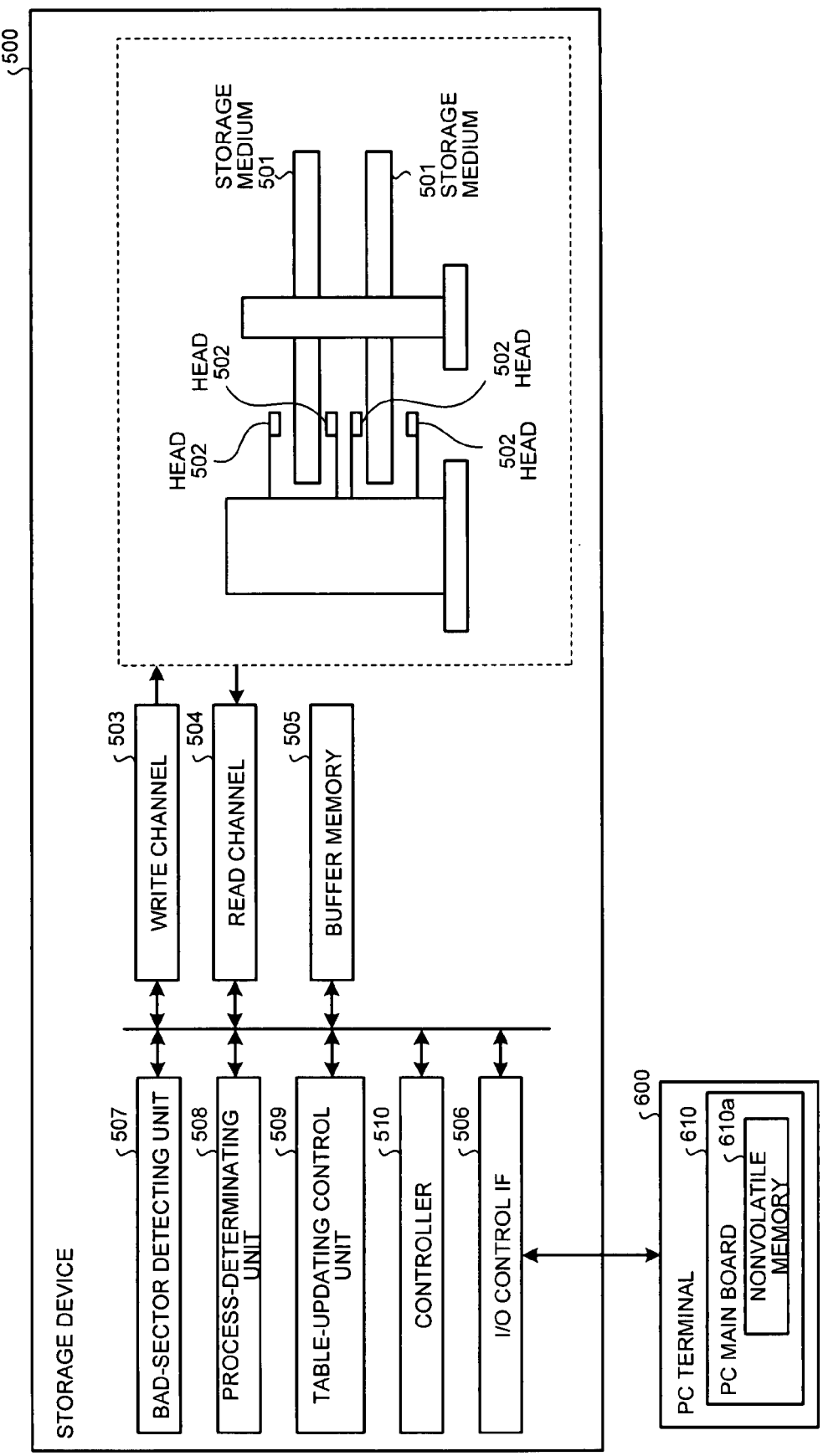
FIG. 22 is a functional block diagram of a storage device according to still another embodiment of the present invention.

(3) Storing the Alternating-Process Control Table in the Nonvolatile Memory on the Personal Computer (PC) Main Board of a PC Terminal The alternating-process control table (see FIGS. 4 and 10) is stored in, but not limited to, the storage medium in the first and second embodiment. The alternating-process control table can be stored in the nonvolatile memory on the PC main board of the PC terminal that is connected to the storage device. FIG. 22 is a functional block diagram of a storage device 500 according to another embodiment of the present invention.

The storage device 500 includes a storage medium 501, a head 502, a write channel 503, a read channel 504, a buffer memory 505, an I/O control IF 506, a bad-sector detecting unit 507, a process determining unit 508, a table-updating control unit 509, and a controller 510. A PC terminal 600 includes a PC main board 610, which has a nonvolatile memory 610a that stores the alternating-process control table. Otherwise the PC terminal 600 is the same in configuration as a typical terminal, and the explanation is omitted.

The storage medium 501, the head 502, the write channel 503, the read channel 504, the buffer memory 505, the I/O control IF 506, the bad-sector detecting unit 507, the process determining unit 508, and the controller 510 shown in FIG. 22 are basically similar to the storage medium 201, the head 202, the write channel 203, the read channel 204, the buffer memory 205, the I/O control IF 206, the bad-sector detecting unit 207, the process determining unit 208, and the controller 210 shown in FIG. 13, and the same explanation is not repeated.

The table-updating control unit 509 updates the alternating-process control table stored in the nonvolatile memory 610a. More specifically, the table-updating control unit 509 updates the alternating-process control table (that corresponds to the storage device 500) based on data obtained from the process determining unit 508 (bad sector ID number, determination result, damping ratio M (only when the determination result indicates rescue process or partial replacement process), a replacement sector ID number (only when the determination result indicates partial replacement process or full-replacement process)).

When physical formatting is performed in the storage device 500 shown in FIG. 22 (when physical formatting is performed on the PC terminal 600 side), the alternating-process control table made upon physical formatting is stored in the nonvolatile memory 610a of the PC terminal 600. This embodiment can be applied when the storage device alone is maintained as usual in price and is used in an ordinary manner. The alternating-process control table is transmitted and received between a main controller (not shown) in the PC main board 610 and the controller 510 to record and reproduce data with respect to the storage medium 501. According to this embodiment, when the storage device 500 is disconnected from the PC terminal 600, it is very difficult to reproduce user data in the storage device 500 alone because the alternating-process control table is present in the PC terminal 600. It is possible to enhance reliability of data stored in the storage medium 501.

Figure 23:
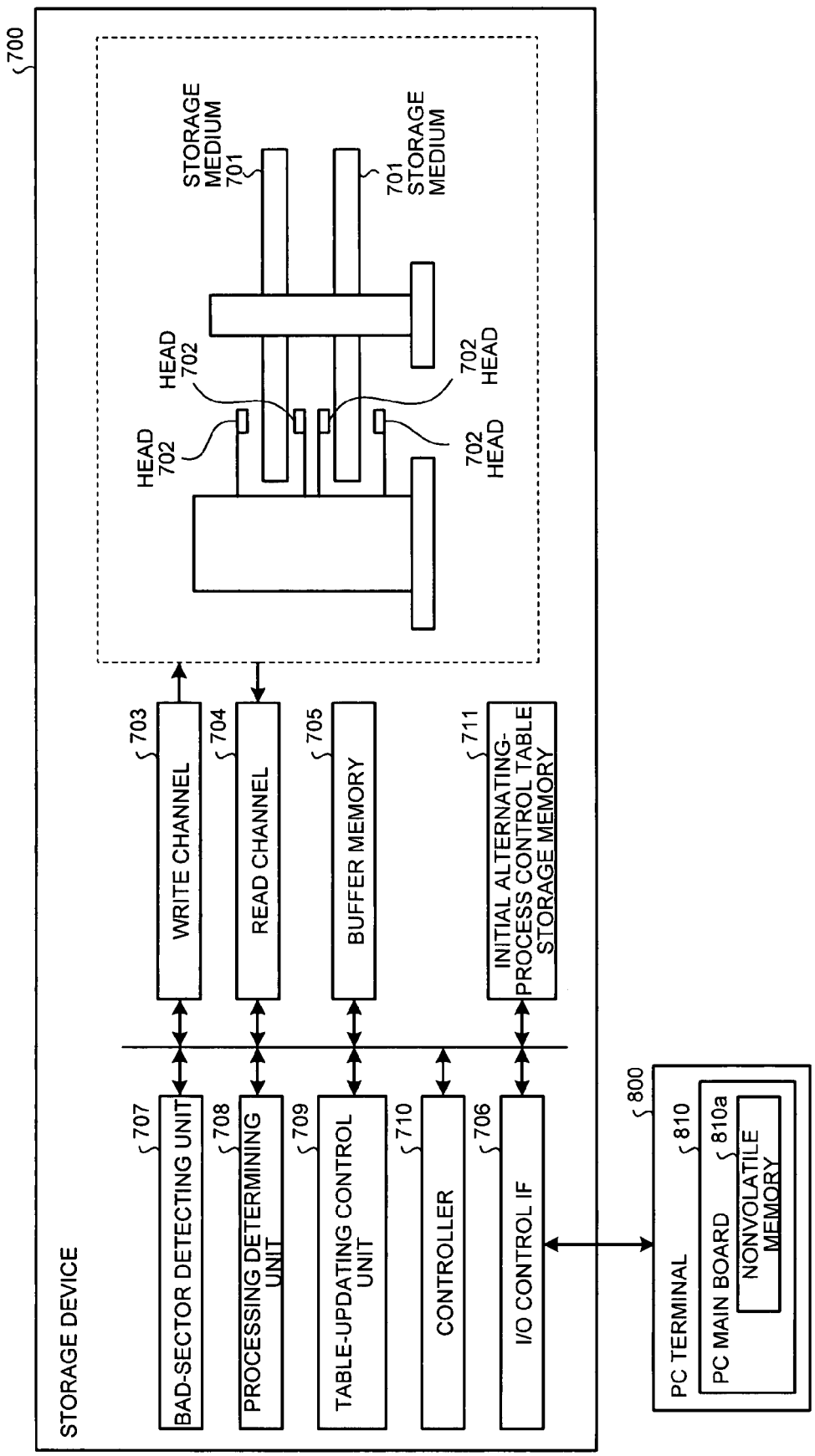
FIG. 23 is a functional block diagram of a storage device according to still another embodiment of the present invention.

(4) Physical Formatting is Performed Before Shipment of the Storage Device and the Alternating-Process Control Table is Stored in the Nonvolatile Memory on the PC Main Board of the User Terminal The alternating-process control table is stored in, but not limited to, the storage medium in the first and second embodiments (see FIGS. 4 and 10). Physical formatting is performed before shipment of the storage device and the alternating-process control table can be stored in the nonvolatile memory on the PC main board of the user terminal connected to the storage device. FIG. 23 is a functional block diagram of a storage device 700 according to another embodiment of the present invention.

The storage device 700 includes a storage medium 701, a head 702, a write channel 703, a read channel 704, a buffer memory 705, an I/O control IF 706, a bad-sector detecting unit 707, a process determining unit 708, a table-updating control unit 709, a controller 710, and an initial alternating-process control table storage memory 711. A PC terminal 800 includes a PC main board 810, which has a nonvolatile memory 810a that stores the alternating-process control table. The PC terminal 800 is of the same configuration as a typical terminal and the explanation is omitted.

The storage medium 701, the head 702, the write channel 703, the read channel 704, the buffer memory 705, the I/O control IF 706, the bad-sector detecting unit 707, the process determining unit 708, and the controller 710 shown in FIG. 23 are basically similar to the storage medium 201, the head 202, the write channel 203, the read channel 204, the buffer memory 205, the I/O control IF 206, the bad-sector detecting unit 207, the process determining unit 208, and the controller 210 shown in FIG. 13, and the same explanation is not repeated.

When physical formatting is performed before shipment of the storage device 700, the table-updating control unit 709 stores the alternating-process control table formed based on physical formatting in the initial alternating-process control table storage memory 711. When the PC terminal 800 is connected to the storage device 700, the table-updating control unit 709 outputs the alternating-process control table stored in the initial alternating-process control table storage memory 711 to the PC terminal 800 and stores the alternating-process control table in the nonvolatile memory 810a. After the connection to the PC terminal 800, data in the alternating-process control table that can be changed in user's use is output in turn to the PC terminal 800 through the table-updating control unit 709, thereby updating the alternating-process control table stored in the nonvolatile memory 810a.

Figure 24:
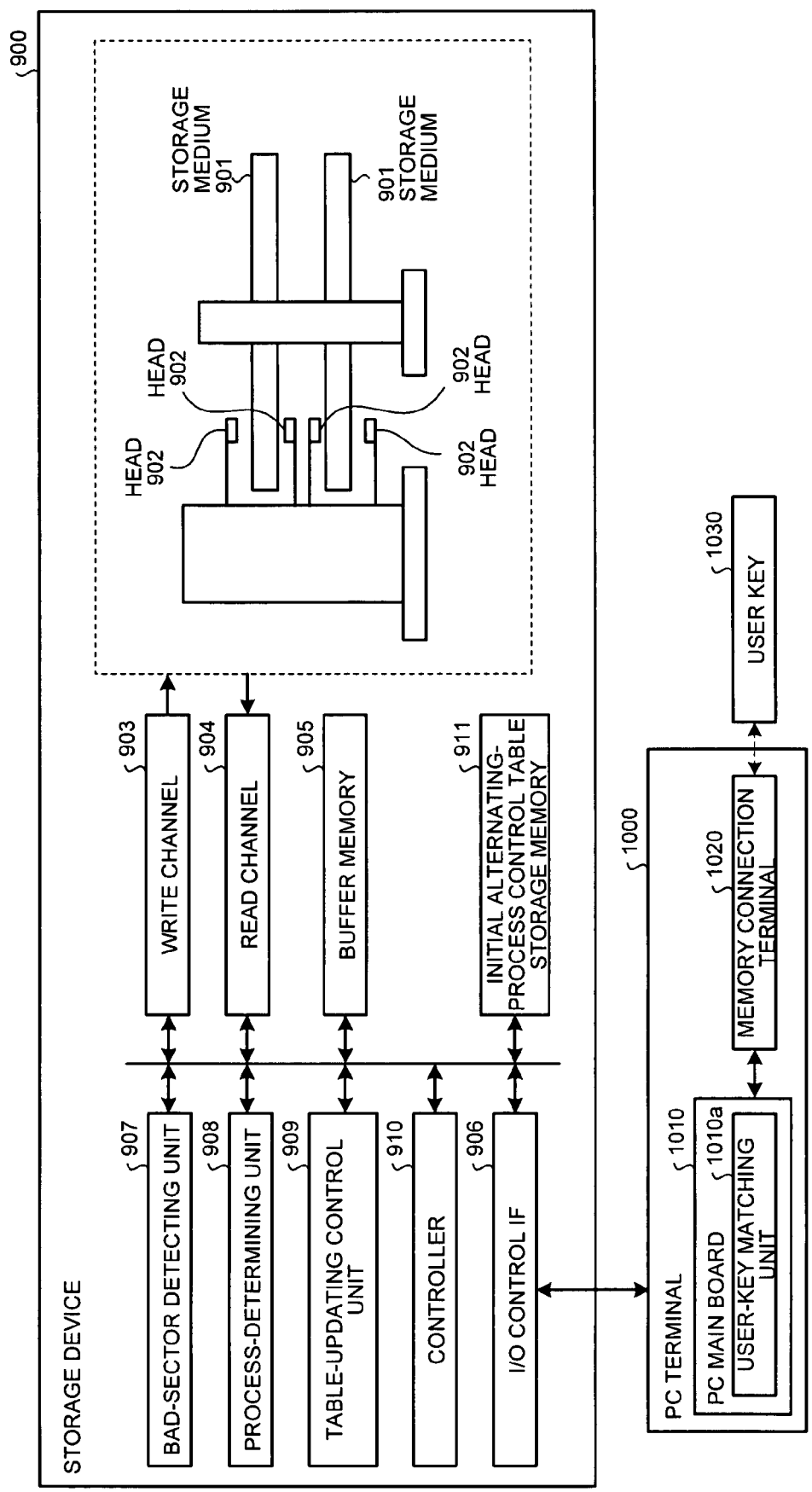
FIG. 24 is a functional block diagram of a storage device according to still another embodiment of the present invention.

(5) The Alternating-Process Control Table is Stored in the Removable Nonvolatile Memory (User Key) and the PC Terminal Implements Matching of a User Key The alternating-process control table is stored in, but not limited to, the storage medium in the first and second embodiments (see FIGS. 4 and 10). The alternating-process control table can be stored in the removable nonvolatile memory (user key) and the PC terminal can implement matching of the user key. FIG. 24 is a functional block diagram of a storage device 900 according to another embodiment of the present invention.

The storage device 900 includes a storage medium 901, a head 902, a write channel 903, a read channel 904, a buffer memory 905, an I/O control IF 906, a bad-sector detecting unit 907, a process determining unit 908, a table-updating control unit 909, a controller 910, and an initial alternating-process control table storage memory 911.

A PC terminal 1000 includes a PC main board 1010 and a memory connection terminal 1020. The PC main board 1010 has a user-key matching unit 1010a to match a user key 1030. The PC terminal 800 is of the same configuration as a typical terminal and the explanation is omitted. Data stored in the user key 1030 has the same structure as shown in FIG. 19 and the explanation is omitted.

The storage medium 901, the head 902, the write channel 903, the read channel 904, the buffer memory 905, the I/O control IF 906, the bad-sector detecting unit 907, the process determining unit 908, and the controller 910 shown in FIG. 24 are basically similar to the storage medium 201, the head 202, the write channel 203, the read channel 204, the buffer memory 205, the I/O control IF 206, the bad-sector detecting unit 207, the process determining unit 208, and the controller 210 shown in FIG. 13, and the same explanation is not repeated.

When physical formatting is performed before shipment of the storage device 900, the table-updating control unit 909 stores the alternating-process control table formed based on physical formatting in the initial alternating-process control table storage memory 911. When the PC terminal 1000 is connected to the storage device 900, the table-updating control unit 909 outputs the alternating-process control table stored in the initial alternating-process control table storage memory 911 to the PC terminal 1000 and stores the alternating-process control table in the user key 1030. After the connection to the PC terminal 1000, data in the alternating-process control table that can be changed in user's use is output in turn to the PC terminal 1000 through the table-updating control unit 909, thereby updating the alternating-process control table stored in the user key 1030.

The user-key matching unit 1010a compares a storage device name identifier of the storage device 900 (that the user-key matching unit 1010a has) with a storage device name identifier that is stored in the user key 1030, and determines whether the storage device name identifiers match each other. When the storage device name identifier of the storage device 900 and the storage device name identifier stored in the user key 1030 do not match each other, the user-key matching unit 1010a prohibits data stored in the user key 1030 from being transmitted to the storage device 900. When the storage device name identifier of the storage device 900 and the storage device name identifier stored in the user key 1030 do not match each other, the user-key matching unit 1010a can prohibit the storage device 900 from activating.

The memory connection terminal 1020 serves to connect the user key 1030 to the PC terminal 1000. The user key 1030 is connected to the memory connection terminal 1020 so that the storage device 900 can access the alternating-process control table stored in the user key 1030 through the PC terminal 1000.

Figure 25:
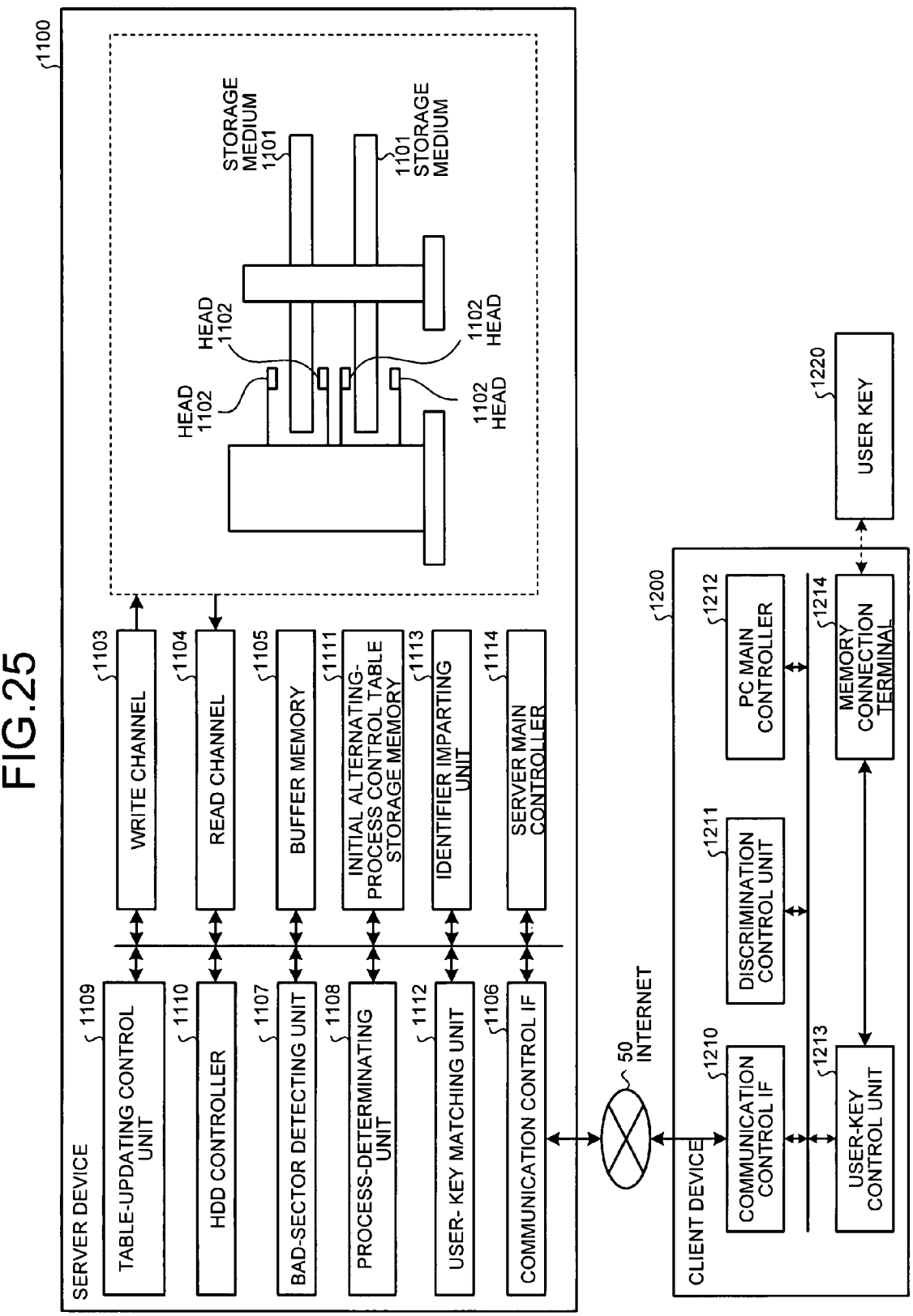
FIG. 25 is a functional block diagram of a sever and a client device that constitute a thin client system.

(6) The Storage Device According to an Embodiment of the Present Invention is Applied to a Thin Client System The storage device according to the first and second embodiments can be applied to the thin client system (a system in which a client device does not have the storage device and a storage device mounted on a server is used). FIG. 25 is a functional block diagram of a sever 1100 and a client device 1200 that constitute the thin client system.

The server 1100 and the client device 1200 are connected to each other through the Internet 50 in the thin client system. The server 1100 provides various services to the client device 1200. The server 1100 includes a storage medium 1101, a head 1102, a write channel 1103, a read channel 1104, a buffer memory 1105, a communication-control IF 1106, a bad-sector detecting unit 1107, a process determining unit 1108, a table-updating control unit 1109, an HDD controller 1110, an initial alternating-process control table storage memory 1111, a user-key matching unit 1112, an identifier imparting unit 1113, and a server main controller 1114.

The storage medium 1101, the head 1102, the write channel 1103, the read channel 1104, the buffer memory 1105, the bad-sector detecting unit 1107, the process determining unit 1108, and the HDD controller 1110 are basically similar to the storage medium 201, the head 202, the write channel 203, the read channel 204, the buffer memory 205, the bad-sector detecting unit 207, the process determining unit 208, and the controller 210 shown in FIG. 13, and the same explanation is not repeated.

The communication-control IF 1106 performs data communication with the client device 1200 based on a predetermined communication protocol.

When physical formatting is performed on the storage medium 1101, the table-updating control unit 1109 stores the alternating-process control table formed based on physical formatting in the initial alternating-process control table storage memory 1111. When the server 1100 first starts data communication with the client device 1200, the table-updating control unit 1109 outputs the alternating-process control table stored in the initial alternating-process control table storage memory 1111 to the client device 1200 and stores the alternating-process control table in a user key 1220. For this moment, it is possible to refer to the initial alternating-process control table storage memory 1111 and access data in the storage device. After the start of data communication with the client device 1200, data of the alternating-process control table that can be altered in user's use is output in turn to the client device 1200 through the table-updating control unit 1109 and the alternating-process control table stored in the user key 1220 is updated and the initial alternating-process control table storage memory 1111 is also updated. After alternating process control data is transmitted to the user key 1220, the table-updating control unit 1109 initializes the initial alternating-process control table storage memory 1111 when a code that stops connecting to the server is transmitted from a user to the server 1100.

The table-updating control unit 1109 compares the alternating-process control table that is not changed with the alternating-process control table that is changed and only data that is updated can be output to the client device 1200. Therefore, the initial alternating-process control table storage memory 1111 has a storage unit that temporarily stores the updated differential data. Thus, only the updated data is output to the client device 1200 so that it is possible to perform efficient data communication with the client device 1200 without impinging on the Internet 50 zone.

The user-key matching unit 1112 compares a storage device name identifier (that the user-key matching unit 1112 has) that corresponds to the storage medium 1101 with a storage device name identifier stored in the user key 1220 and determines whether the storage device name identifiers match each other. When the storage device name identifier that the user-key matching unit 1112 has and the storage device name identifier stored in the user key 1220 do not match each other, the user-key matching unit 1112 prohibits data stored in the user key 1220 from being transmitted to the server 1100. When the storage device name identifier that the user-key matching unit 1112 has and the storage device name identifier stored in the user key 1220 do not match each other, the user-key matching unit 1112 can also prohibit the server 1100 from activating.

When the table-updating control unit 1109 outputs the alternating-process control table to the client device 1200, the identifier imparting unit 1113 imparts an identifier to discriminate user data from the alternating-process control table. The server main controller 1114 controls the server 1100, and provides various services in response to service requests from the client device 1200.

The client device 1200 receives various services from the server 1100 and includes a communication-control IF 1210, a discrimination control unit 1211, a PC main controller 1212, a user-key management unit 1213, and a memory connection terminal 1214.

The communication-control IF 1210 performs data communication with the server 1100 based on a predetermined communication protocol. The discrimination control unit 1211 determines whether transmitted data is user data or the alternating-process control table based on an identifier of data transmitted from the server 1100 for discrimination. When the discrimination control unit 1211 determines that the data transmitted from the server 1100 is user data, the discrimination control unit 1211 outputs the user data to the PC main controller 1212 and causes the PC main controller 1212 to perform various processes.

On the other hand, when the discrimination control unit 1211 determines that the data transmitted from the server 1100 is the alternating-process control table, the discrimination control unit 1211 outputs the transmitted data to the user-key management unit 1213.

The PC main controller 1212 controls the client device 1200 and performs various processes based on user data transmitted from the server. The user-key management unit 1213 controls the user key 1220 connected to the memory connection terminal 1214. When the user-key management unit 1213 obtains updated data in the alternating-process control table, the user-key management unit 1213 updates the alternating-process control table stored in the user key 1220. When the user-key management unit 1213 receives a request of the alternating-process control table from the server 1100, the alternating-process control table stored in the user key 1220 is transmitted to the server 1100.

The user-key management unit 1213 is in cooperation with the table-updating control unit 1109 and locks the user key 1220 not to get it out until the updated data in the alternating-process control table is completely reflected in the user key 1220.

Figure 26:
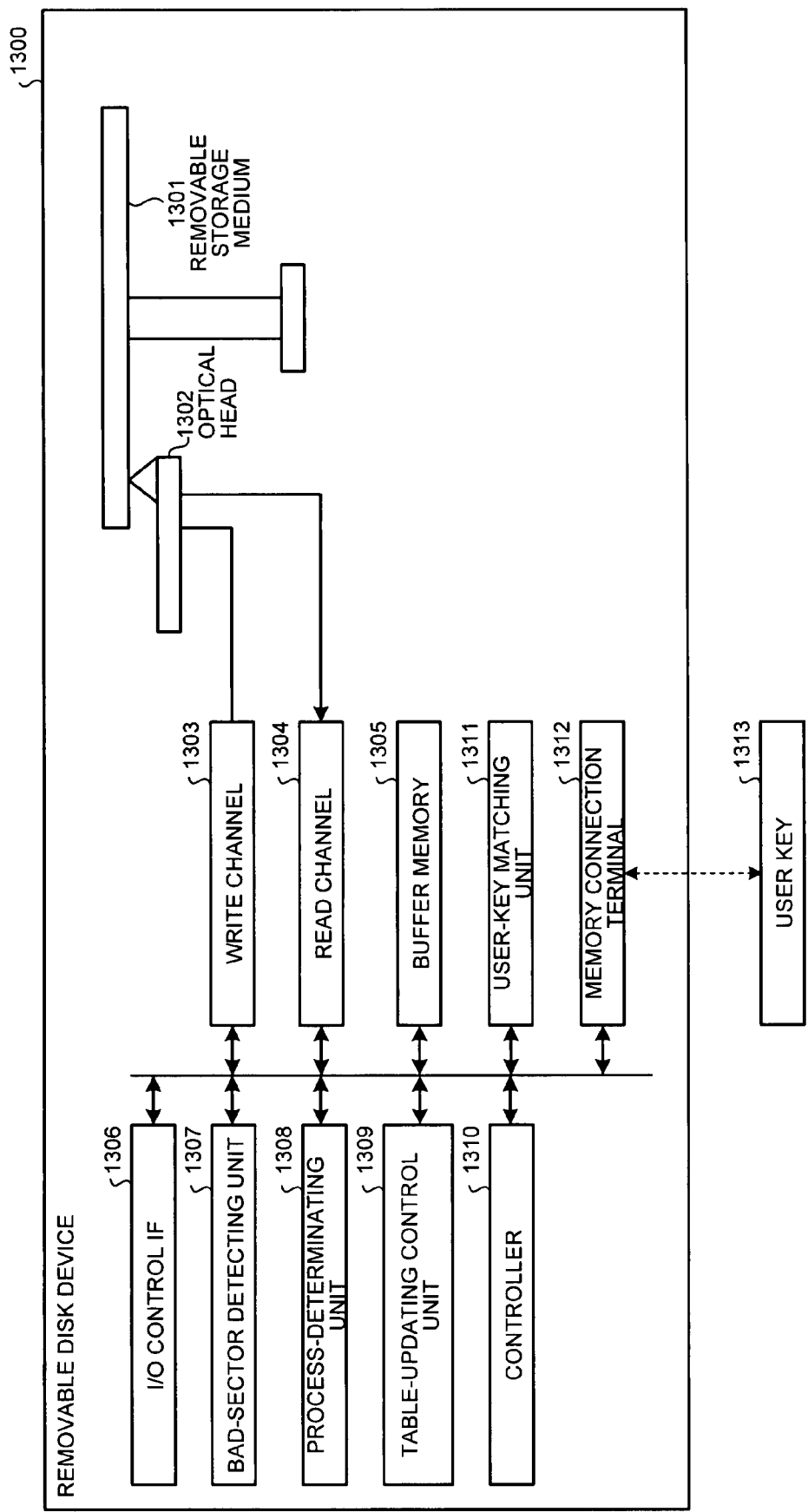
FIG. 26 is a functional block diagram of a removable disk device.

(7) An Embodiment of the Present Invention is Applied to a Removable Disk Device The present invention according to the first and second embodiments can be applied to the removable disk device with a removable disk. FIG. 26 is a functional block diagram of a removable disk device 1300. The removable disk device 1300 includes a removable storage medium 1301, an optical head 1302, a write channel 1303, a read channel 1304, a buffer memory 1305, an I/O control IF 1306, a bad-sector detecting unit 1307, a process determining unit 1308, a table-updating control unit 1309, a controller 1310, a user-key matching unit 1311, and a memory connecting terminal 1312.

The removable storage medium 1301 can be removed from the removable disk device 1300 and, for example, corresponds to an optical disc. An explanation is given about, but not limited to, the removable storage medium 1301 as an optical disc. The optical head 1302 records and reproduces data with respect to the removable storage medium 1301. A medium identifier to discriminate the removable storage medium 1301 is previously stored in a predetermined storage area of the removable storage medium 1301. The medium identifier is output through the optical head 1302 to the user-key matching unit 1311.

The write channel 1303, read channel 1304, buffer memory 1305, I/O control IF 1306, bad-sector detecting unit 1307, process determining unit 1308, and controller 1310 are explained in the same manner as the write channel 203, read channel 204, buffer memory 205, I/O control IF 206, bad-sector detecting unit 207, process determining unit 208, and controller 210 shown in FIG. 13 and the explanation is omitted.

The table-updating control unit 1309 updates the alternating-process control table stored in a user key 1313. More specifically, the table-updating control unit 1309 updates the alternating-process control table (corresponding to the removable disk device 1300) based on data obtained from the process determining unit 1308 (bad sector ID number, determination result, damping ratio M (only when the determination result shows rescue process or partial replacement process)), and replacement sector ID number (only when performing partial replacement process or full-replacement process).

The table-updating control unit 1309 accesses the alternating-process control table corresponding to the storage device name identifier of the removable disk device 1300 stored in the user key 1313 and the medium identifier and updates the alternating-process control table in turn.

Figure 27:
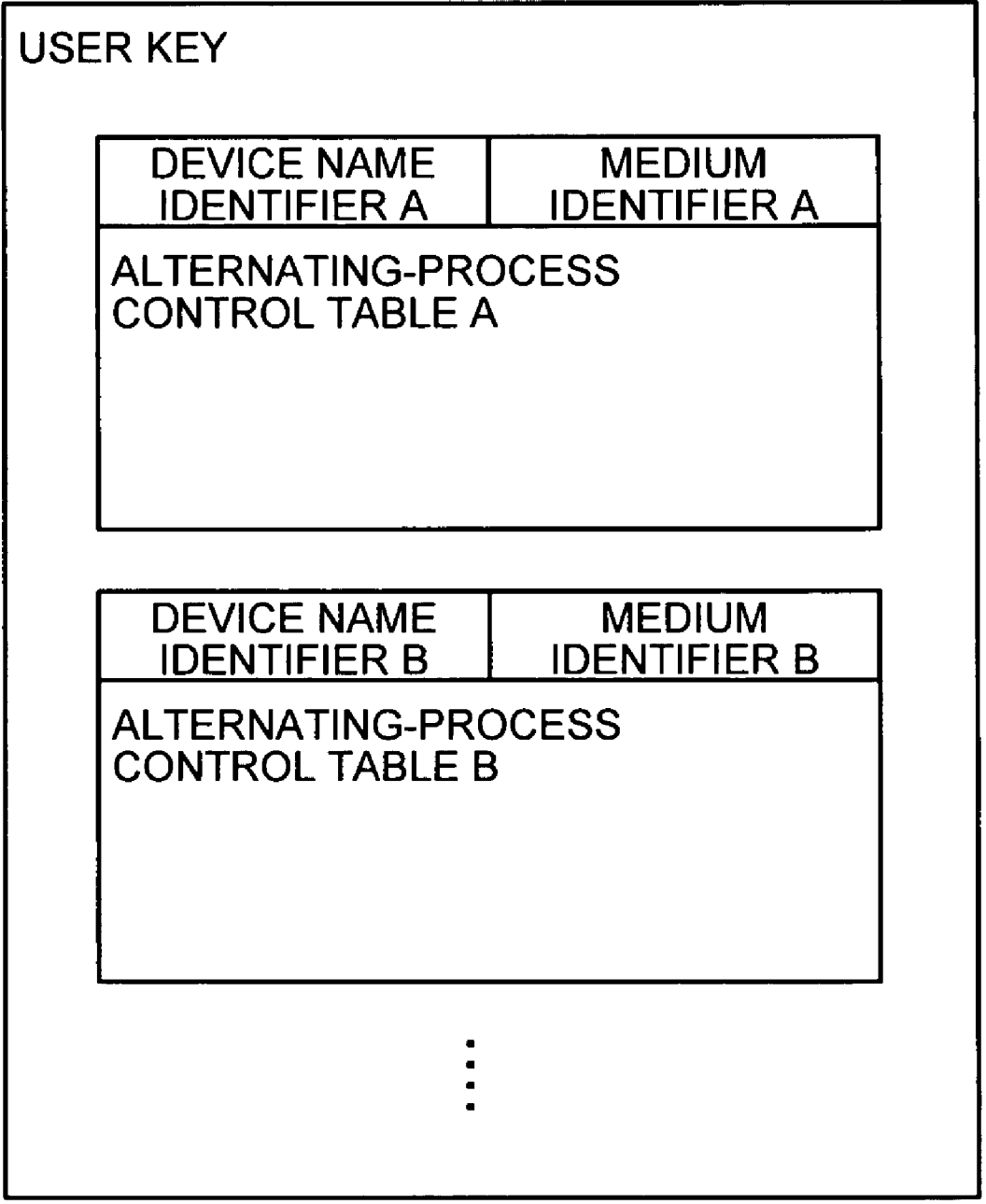
FIG. 27 is an example of data of a user key used in the removable disk device.

FIG. 27 is an example of data of the user key used in the removable disk device 1300.

As shown in FIG. 27, the user key 1313 stores therein the storage device name identifier that discriminates the removable disk device, the medium identifier that discriminates the removable storage medium 1301, and the alternating-process control table that are associated with one another. The alternating-process control table is the same as that shown in FIG. 17. The user key 1313 stores not only a single alternating-process control table but also plural alternating-process control tables corresponding to a plurality of the removable disk devices 1300 and removable storage mediums 1301.

Returning to FIG. 26, the user-key matching unit 1311 compares the storage device name identifier of the removable disk device 1300, the medium identifier of the removable storage medium 1301 (that the user-key matching unit 1311 has) with the storage device name identifier and the medium identifier stored in the user key 1313, and determines whether they match. When the identifiers do not match, the user-key matching unit 1311 prohibits data stored in the user key 1313 from being transmitted to the removable disk device 1300. When the identifiers do not match, the user-key matching unit 1311 can prohibit the removable disk device 1300 from activating.

Thus, the user-key matching unit 1311 performs user key matching based on the storage device name identifier and the medium identifier so that it is possible to enhance securities with respect to the removable storage medium 1301.

The memory connection terminal 1312 connects the user key 1313 to the removable disk device 1300. The user key 1313 is connected to the memory connection terminal 1312 so that the removable disk device 1300 can access the alternating-process control table stored in the user key 1313.

When the user key 1313, the removable disk device 1300, the removable storage medium 1301 are not associated with one another in this embodiment, there is a high likelihood that data in the removable storage medium 1301 is destroyed. To prevent the data from being destroyed, the storage device name identifier and the medium identifier of the removable disk device 1300 are registered to the user-key matching unit 1311. After a user buys the removable disk device 1300, the user-key matching unit 1311 registers the storage device name identifier and the medium identifier in the user key 1313 in initial activation. When the user key 1313 is connected to the removable disk device 1300 since the following time, the user-key matching unit 1311 performs matching and the removable disk device 1300 gets started.

When a set of the removable disk device 1300 and the user key 1313 is sold, the storage device name identifier can be previously registered in the user key 1313. It is possible to previously store the medium identifier in the removable storage medium 1301 that a user uses and also in the user key 1313.

In addition, a user can register the medium identifier of the removable storage medium 1301. When a user himself or herself registers the medium identifier in the removable storage medium 1301, the user connects the user key 1313 to the memory connection terminal 1312 and the user-key matching unit 1311 compares the storage device name identifier of the removable disk device 1300 with the storage device name identifier stored in the user key 1313. When the storage device name identifiers match, the user-key matching unit 1311 acquires a medium identifier that the user desires and stores the acquired medium identifier in the removable storage medium 1301 and a medium identifier associated with the user key.

(8) A PC Terminal is Connected to the Removable Disk Device to which an Embodiment of the Present Invention is Applied and User Key Matching is Performed on the PC Terminal Side The present invention according to the first and second embodiments is applied to the removable disk device that includes a removable disk and user key matching can be performed on the side of the PC terminal that is connected to the removable disk device. FIG. 28 is a functional block diagram of a removable disk device 1400. The removable disk device 1400 includes a removable storage medium 1401, an optical head 1402, a write channel 1403, a read channel 1404, a buffer memory 1405, an I/O control IF 1406, a bad-sector detecting unit 1407, a process determining unit 1408, a table-updating control unit 1409, a controller 1410, and an initial alternating-process control table storage memory 1411. A PC terminal 1500 includes a PC main board 1510, which has a user-key matching unit 1510a that matches data stored in a user key 1520. Otherwise the PC terminal 1500 is the same in configuration as a typical terminal, and the explanation is omitted.

The removable storage medium 1401, optical head 1402, write channel 1403, read channel 1404, buffer memory 1405, I/O control IF 1406, bad-sector detecting unit 1407, process determining unit 1408, and controller 1410 shown in FIG. 28 are the same as the removable storage medium 1301, optical head 1302, write channel 1303, read channel 1304, buffer memory 1305, I/O control IF 1306, bad-sector detecting unit 1307, process determining unit 1308, and controller 1310 shown in FIG. 26 and the explanation is omitted.

The table-updating control unit 1409 updates the alternating-process control table stored in the user key 1520. More specifically, the table-updating control unit 1409 updates the alternating-process control table (that corresponds to the removable disk device 1400) based on data obtained from the process determining unit 1408 (bad sector ID number, determination result, damping ratio M (only when the determination result indicates rescue process or partial replacement process), a replacement sector ID number (only when the determination result indicates partial replacement process or full-replacement process)).

The user-key matching unit 1510a compares a storage device name identifier of the removable disk device 1400, a medium identifier of the removable storage medium 1401 (that the user-key matching unit 1510a has), a storage device name identifier and a medium identifier both of which are stored in the user key 1520, and determines whether they match one another. When the identifiers do not match, the user-key matching unit 1510a prohibits data stored in the user key 1520 from being transmitted to the removable disk device 1400. When the identifiers do not match, the user-key matching unit 1510a can prohibit the removable disk device 1400 from activating.

A memory connection terminal 1511 connects the user key 1520 to the PC terminal 1500. The user key 1520 is connected to the memory connection terminal 1511 so that the removable disk device 1400 can access the alternating-process control table stored in the user key 1520 through the PC terminal 1500.

Data stored in the user key 1520 has the same structure as that in the user key 1313 shown in FIG. 26, and the explanation is omitted.

A computer programs can be executed on a computer to implement the various processes described in the above embodiments. Explaining in connection with FIG. 5, the computer programs are stored in a storage memory such as a read only memory (ROM) (not shown). The controller 110 reads the computer programs from the ROM and executes them to implement the functions or processes performed by the respective units (rescue process, slipping process, partial replacement process, full-replacement process, and the like).

The computer programs are not necessarily stored in the ROM in advance. The computer programs can be stored in a portable physical medium to be connected to the computer or a fixed physical medium inside or outside the computer such as a hard disk drive (HDD). Examples of the portable physical medium include a flexible disk (FD), a compact disk read-only memory (CD-ROM), a digital versatile disk (DVD), a magnetic optical disk, and an integrated circuits (IC) card. The computer programs can also be stored in another computer (or a server) that is connected to the computer via a network such as a public line, the Internet, a local area network (LAN), and a wide area network (WAN). Then, the computer reads out the computer programs from the recoding medium, and executes them.

Of the processes described in the embodiments, all or part of the processes explained as being performed automatically can be performed manually. Similarly, all or part of the processes explained as being performed manually can be performed automatically by a known method.

The processing procedures, the control procedures, specific names, and information including various data and parameters described in the embodiments or shown in the drawings can be changed as required unless otherwise specified.

The constituent elements of the device shown in the drawings are merely conceptual, and need not be physically configured as illustrated. The constituent elements, as a whole or in part, can be separated or integrated either functionally or physically based on various types of loads or use conditions.

The process functions performed by the device are entirely or partially realized by a central processing unit (CPU) or a micro controller unit (MCU) or computer programs that are analyzed and executed by CPU or MCU, or realized as hardware by wired logic.

As set forth hereinabove, according to an embodiment of the present invention, when a bad sector is detected on a storage medium, the bad sector is rescued and reused. Thus, it is possible to suppress a decrease in the capacity of the storage medium due to the bad sector to the minimum.

Moreover, bad sectors are increased with the use of a storage device. However, the capacity of the storage medium due to the bad sectors can be prevented from decreasing, which extends the service life of the storage device.

Furthermore, when the same amount of data as that stored in other sectors is stored in a bad sector, only part of data that cannot be stored in the bad sector is stored in a replacement sector, , a storage area different from the bad sector. Thus, the storage area of the replacement sector can be effectively utilized.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A storage device that performs formatting to divide a storage area of a storage medium into sectors of predetermined bytes and records data on the sectors, the storage device comprising:
   a detecting unit that detects from the sectors a bad sector with an error rate to be equal to or higher than a reference value; and
   a control unit that records data on the bad sector at a recording density lower than a recording density at which data is recorded on other sectors, wherein, when the data to be recorded on the bad sector has a volume identical to a volume of data recorded on the other sectors, the control unit records part of the data that cannot be recorded on the bad sector on a replacement sector, the replacement sector being a storage area different from the bad sector.

2. The storage device according to claim 1, wherein the control unit records the data on the bad sector with less number of recording clocks than number of recording clocks for recording data on the other sectors.

3. The storage device according to claim 2, further comprising a calculating unit that calculates cyclic redundancy check bits and error correcting code bits based on the data to be recorded on the bad sector, and adds the cyclic redundancy check bits and the error correcting code bits to the data recorded on the bad sector.

4. The storage device according to claim 2, wherein the control unit controls the number of recording clocks based on a result of recording the data on the bad sector.

5. The storage device according to claim 1, wherein the storage medium stores therein a table that contains number of recording clocks used to record the data on the bad sector, identification information that identifies the bad sector, and process performed for the bad sector in an associated manner.

6. The storage device according to claim 1, further comprising a table storage unit that stores therein a table that contains number of recording clocks used to record the data on the bad sector, identification information that identifies the bad sector, and process performed for the bad sector in an associated manner.

7. A control device that performs formatting to divide a storage area of a storage medium into sectors of predetermined bytes and records data on the sectors, the storage device comprising:
   a detecting unit that detects from the sectors a bad sector with an error rate to be equal to or higher than a reference value; and
   a control unit that records data on the bad sector at a recording density lower than a recording density at which data is recorded on other sectors, wherein, when the data to be recorded on the bad sector has a volume identical to a volume of data recorded on the other sectors, the control unit records part of the data that cannot be recorded on the bad sector on a replacement sector, the replacement sector being a storage area different from the bad sector.

* * * * *